(12) United States Patent
Stone et al.

(10) Patent No.: US 10,976,334 B2
(45) Date of Patent: Apr. 13, 2021

(54) IN-LINE PRESSURE ACCUMULATOR AND FLOW-CONTROL SYSTEM FOR BIOLOGICAL OR CHEMICAL ASSAYS

(71) Applicant: Illumina, Inc., San Diego, CA (US)

(72) Inventors: Michael J. Stone, San Diego, CA (US); Brad Drews, San Diego, CA (US); Erik Williamson, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 451 days.

(21) Appl. No.: 15/754,987

(22) PCT Filed: Aug. 17, 2016

(86) PCT No.: PCT/US2016/047253
§ 371 (c)(1),
(2) Date: Feb. 23, 2018

(87) PCT Pub. No.: WO2017/034868
PCT Pub. Date: Mar. 2, 2017

(65) Prior Publication Data
US 2020/0233004 A1 Jul. 23, 2020

Related U.S. Application Data

(60) Provisional application No. 62/209,040, filed on Aug. 24, 2015.

(51) Int. Cl.
*G01N 35/10* (2006.01)
*G01N 35/00* (2006.01)

(52) U.S. Cl.
CPC ..... *G01N 35/1097* (2013.01); *G01N 35/0092* (2013.01)

(58) Field of Classification Search
None
See application file for complete search history.

(56) References Cited

U.S. PATENT DOCUMENTS 5,324,633 A 6/1994 Fodor et al.
5,451,683 A 9/1995 Barrett et al.
(Continued)

FOREIGN PATENT DOCUMENTS

CN 102574124 7/2012
CN 102814203 12/2012
(Continued)

OTHER PUBLICATIONS

EP16839829.5, Supplementary European Search Report dated Jul. 9, 2018, 8 pages.
(Continued)

*Primary Examiner* — Matthew D Krcha
(74) *Attorney, Agent, or Firm* — Illumina, Inc.

(57) ABSTRACT

Flow-control system includes a fluid reservoir configured to store a fluid, a pressure accumulator in flow communication with and positioned downstream from the fluid reservoir, and a loading zone that is configured to receive and fluidly couple to a flow cell having a biological or chemical sample. The loading zone is in flow communication with and positioned downstream from the pressure accumulator. The flow-control system also includes a system pump in flow communication with and positioned downstream from the loading zone. The system pump is configured to induce a flow of the fluid from the fluid reservoir and through the pressure accumulator and the loading zone. The pressure accumulator is configured to receive fluid from the fluid reservoir during a filling operation. The pressure accumu-
(Continued)

lator is configured to impart pressure on the fluid and drive the fluid toward the loading zone during a pressure-assist operation.

25 Claims, 16 Drawing Sheets

(56) References Cited

U.S. PATENT DOCUMENTS

| | | | |
|---|---|---|---|
| 5,482,867 A | 1/1996 | Barrett et al. | |
| 5,491,074 A | 2/1996 | Aldwin et al. | |
| 5,624,711 A | 4/1997 | Sundberg et al. | |
| 5,641,658 A | 6/1997 | Adams et al. | |
| 5,744,305 A | 4/1998 | Fodor et al. | |
| 5,795,716 A | 8/1998 | Chee et al. | |
| 5,831,070 A | 11/1998 | Pease et al. | |
| 5,856,101 A | 1/1999 | Hubbell et al. | |
| 5,858,659 A | 1/1999 | Sapolsky et al. | |
| 5,874,219 A | 2/1999 | Rava et al. | |
| 5,968,740 A | 10/1999 | Fodor et al. | |
| 5,974,164 A | 10/1999 | Chee et al. | |
| 5,981,185 A | 11/1999 | Matson et al. | |
| 5,981,956 A | 11/1999 | Stern | |
| 6,022,963 A | 2/2000 | McGall et al. | |
| 6,025,601 A | 2/2000 | Trulson et al. | |
| 6,033,860 A | 3/2000 | Lockhart et al. | |
| 6,083,697 A | 7/2000 | Beecher et al. | |
| 6,090,555 A | 7/2000 | Fiekowsky et al. | |
| 6,136,269 A | 10/2000 | Winkler et al. | |
| 6,266,459 B1 | 7/2001 | Walt et al. | |
| 6,291,183 B1 | 9/2001 | Pirrung et al. | |
| 6,309,831 B1 | 10/2001 | Goldberg et al. | |
| 6,355,431 B1 | 3/2002 | Chee et al. | |
| 6,416,949 B1 | 7/2002 | Dower et al. | |
| 6,428,752 B1 | 8/2002 | Montagu | |
| 6,482,591 B2 | 11/2002 | Lockhart et al. | |
| 6,770,441 B2 | 8/2004 | Dickinson et al. | |
| 6,859,570 B2 | 2/2005 | Walt et al. | |
| 7,057,026 B2 | 6/2006 | Barnes et al. | |
| 7,115,400 B1 | 10/2006 | Adessi et al. | |
| 7,211,414 B2 | 5/2007 | Hardin et al. | |
| 7,315,019 B2 | 1/2008 | Turner et al. | |
| 7,329,492 B2 | 2/2008 | Hardin et al. | |
| 7,405,281 B2 | 7/2008 | Xu et al. | |
| 7,541,444 B2 | 6/2009 | Milton et al. | |
| 7,566,537 B2 | 7/2009 | Balasubramanian et al. | |
| 7,622,294 B2 | 11/2009 | Walt et al. | |
| 7,985,565 B2 | 7/2011 | Mayer et al. | |
| 8,460,910 B2 | 6/2013 | Smith et al. | |
| 8,623,628 B2 | 1/2014 | Ost et al. | |
| 2002/0055100 A1 | 5/2002 | Kawashima et al. | |
| 2003/0108867 A1 | 6/2003 | Chee et al. | |
| 2003/0108900 A1 | 6/2003 | Oliphant et al. | |
| 2003/0170684 A1 | 9/2003 | Fan et al. | |
| 2003/0207295 A1 | 11/2003 | Gunderson et al. | |
| 2004/0002090 A1 | 1/2004 | Mayer et al. | |
| 2004/0096853 A1 | 5/2004 | Mayer et al. | |
| 2005/0064460 A1 | 3/2005 | Holliger et al. | |
| 2005/0130173 A1 | 6/2005 | Leamon et al. | |
| 2005/0181394 A1 | 8/2005 | Steemers et al. | |
| 2005/0227252 A1 | 10/2005 | Moon et al. | |
| 2007/0039866 A1* | 2/2007 | Schroeder | C12Q 1/6874 210/265 |
| 2007/0099208 A1 | 5/2007 | Drmanac et al. | |
| 2007/0128624 A1 | 6/2007 | Gormley et al. | |
| 2007/0183935 A1 | 8/2007 | Clemmens et al. | |
| 2008/0009420 A1 | 1/2008 | Schroth et al. | |
| 2008/0108082 A1 | 5/2008 | Rank et al. | |
| 2009/0260701 A1* | 10/2009 | Rich | F15B 1/021 138/30 |
| 2009/0325276 A1 | 12/2009 | Battrell et al. | |
| 2011/0306031 A1* | 12/2011 | Rich | G01N 15/1404 435/3 |
| 2012/0085422 A1 | 4/2012 | Boyd et al. | |
| 2012/0125126 A1 | 5/2012 | Subramanian | |
| 2012/0270305 A1 | 10/2012 | Reed et al. | |
| 2012/0312380 A1 | 12/2012 | Daub et al. | |
| 2013/0079232 A1 | 3/2013 | Kain et al. | |
| 2013/0130262 A1 | 5/2013 | Battrell et al. | |
| 2013/0260372 A1 | 10/2013 | Buermann et al. | |
| 2015/0045234 A1 | 2/2015 | Stone et al. | |
| 2015/0125944 A1* | 5/2015 | Olson | G01N 15/1404 435/288.7 |

FOREIGN PATENT DOCUMENTS

| | | |
|---|---|---|
| WO | 1991/006678 | 5/1991 |
| WO | 2000/063437 | 10/2000 |
| WO | 2004/018497 | 3/2004 |
| WO | 2004/024328 | 3/2004 |
| WO | 2005/010145 | 2/2005 |
| WO | 2005/033681 | 4/2005 |
| WO | 2005/065814 | 7/2005 |
| WO | 2006/064199 | 6/2006 |
| WO | 2007/010251 | 1/2007 |
| WO | 2007/123744 | 11/2007 |
| WO | 2014/091321 A1 | 6/2014 |
| WO | 2014/143010 | 9/2014 |
| WO | 2015/187868 | 12/2015 |

OTHER PUBLICATIONS

Bentley, et al., "Accurate whole human genome sequencing using reversible terminator chemistry", Nature, vol. 456, 2008, 53-59.

Dressman, et al., "Transforming single DNA molecules into fluorescent magnetic particles for detection and enumeration of genetic variations", Proc. Natl. Acad. Sci. USA 100 (15), 2003, 8817-8822.

Lizardi, et al., "Mutation detection and single-molecule counting using isothermal rolling-circle amplification", Nature Genetics, vol. 19, 1998, 225-232.

* cited by examiner

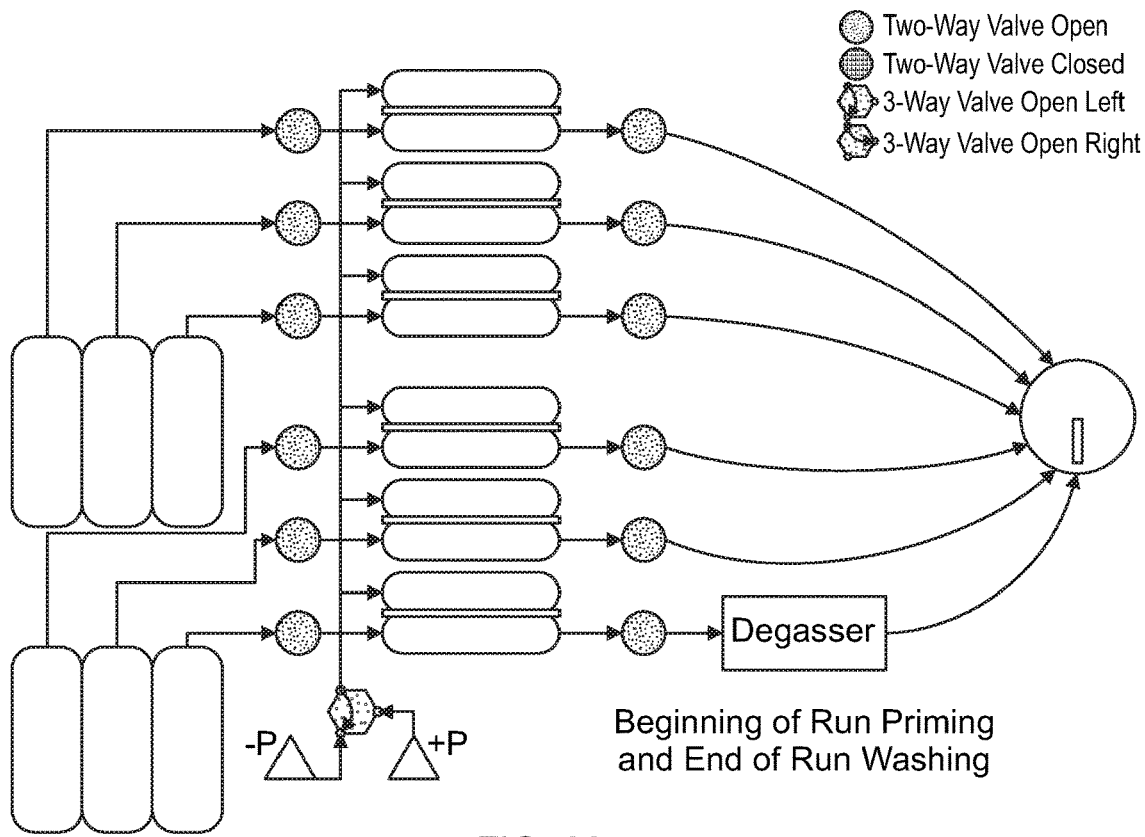
FIG. 20 — Beginning of Run Priming and End of Run Washing
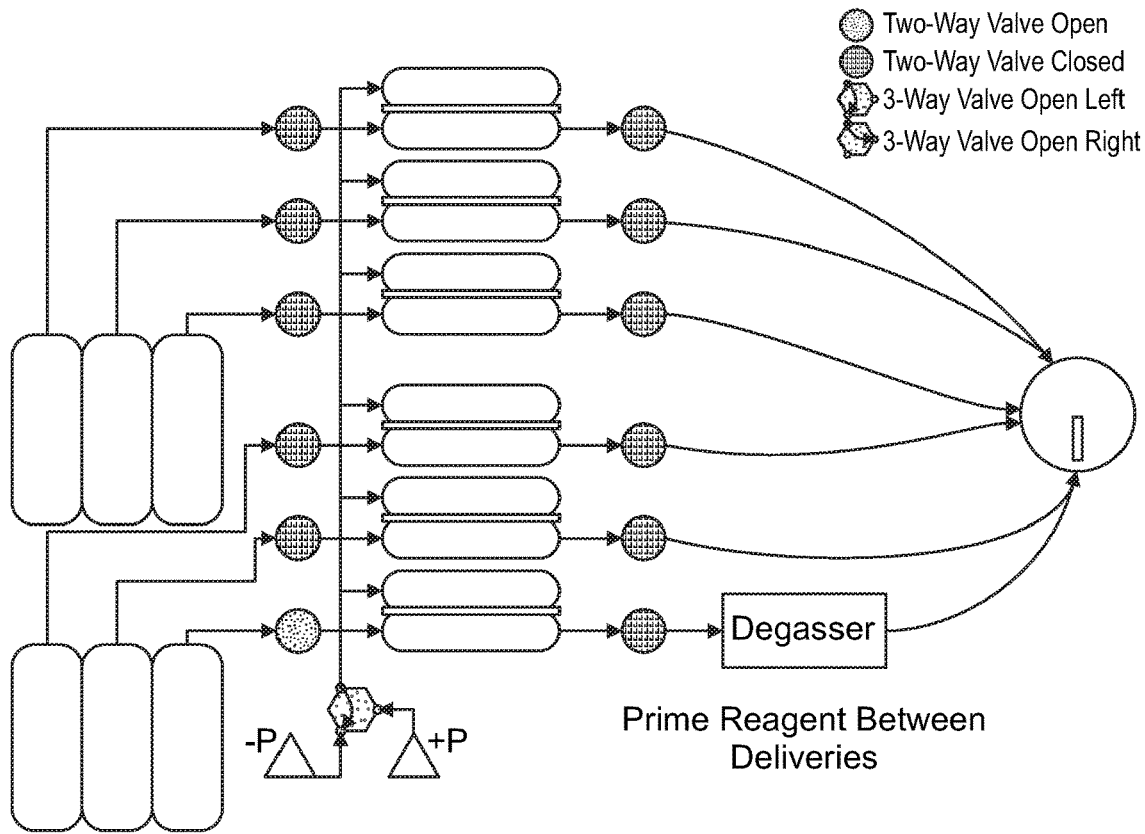
FIG. 21 — Prime Reagent Between Deliveries

IN-LINE PRESSURE ACCUMULATOR AND FLOW-CONTROL SYSTEM FOR BIOLOGICAL OR CHEMICAL ASSAYS

CROSS-REFERENCE TO RELATED APPLICATIONS

The present application is a 35 U.S.C. § 371 National Stage application of International Patent Application No. PCT/US2016/047253, filed on Aug. 17, 2016, which further claims the benefit of priority of U.S. Provisional Application No. 62/209,040, filed on Aug. 24, 2015; each of the aforementioned applications is incorporated herein by reference in its entirety.

BACKGROUND

Embodiments of the present application relate generally to systems and method for controlling flow of a fluid through a system configured for biological or chemical analysis of a sample or configured for sample preparation.

Various assay protocols used for biological or chemical research are concerned with performing a large number of controlled reactions. In some cases, the controlled reactions are performed on a flow cell. The flow cell may have, for example, inlets, outlets, and a plurality of channels extending therebetween. Reagents may be delivered to the flow cell in order to carry out the designated reactions. The designated reactions may then be observed and analyzed to help identify properties or characteristics of the chemicals involved. For example, one known sequencing-by-synthesis (SBS) technique involves the enzymatic extension of a nucleic acid strand through the iterative addition of nucleotides against a template strand. In traditional methods of SBS, a single nucleotide monomer may be provided to a target nucleic acid in the presence of a polymerase in each delivery. The target nucleic acid is typically immobilized to a surface of the flow cell. For each cycle in which a nucleotide is added to the target nucleic acid, a number of solutions are delivered to the flow cell, such as a reagent solution (e.g., nucleotides, polymerase) and a wash solution.

Flow-control systems for biological and chemical analysis include a reagent reservoir and a pump that is configured to induce a flow of the fluid from the reagent reservoir to the flow cell. One challenge for flow-control systems that carry out designated protocols, such as the SBS protocol described above, is that the speed at which the fluid may be delivered to the flow cell is limited by system resistances. Moreover, increasing the flow rate of the fluids may cause a pressure drop that increases the likelihood of degasification, which may be undesirable for certain applications. To offset this pressure drop, the reagent reservoir may be pressurized. However, increasing the pressure of the fluid at the reagent reservoir can be challenging due to the volume of the fluid in the reservoir. Moreover, the increased pressure may risk gassing the fluid (i.e., introducing external air into the fluid at the reagent reservoir).

BRIEF DESCRIPTION

In an embodiment, a flow-control system is provided that includes a fluid reservoir configured to store a fluid, a pressure accumulator in flow communication with and positioned downstream from the fluid reservoir, and a loading zone that is configured to receive and fluidly couple to a flow cell having a biological or chemical sample. The loading zone is in flow communication with and positioned downstream from the pressure accumulator. The flow-control system also includes a system pump in flow communication with and positioned downstream from the loading zone. The system pump is configured to induce a flow of the fluid from the fluid reservoir and through the pressure accumulator and the loading zone. The pressure accumulator includes a wall actuator and an interior chamber that is defined by a movable chamber wall and has an operating volume. The wall actuator is configured to move the chamber wall and thereby change the operating volume of the interior chamber. The pressure accumulator is configured to receive fluid into the interior chamber from the fluid reservoir during a filling operation. The wall actuator is configured to move the chamber wall to impart pressure on the fluid and drive the fluid toward the loading zone during a pressure-assist operation.

In one aspect, the flow-control system includes a processing unit that is configured to control operation of the system pump and the pressure accumulator in accordance with a predetermined schedule. The predetermined schedule includes repeating the filling operation and the pressure-assist operation at least ten times. Optionally, the processing unit is configured to control operation of the system pump and the pressure accumulator in accordance with a sequencing-by-synthesis (SBS) protocol. Optionally, the processing unit is configured to control operation of the system pump and the pressure accumulator to perform a recycling operation in which the fluid from the flow cell is drawn back to the interior chamber of the pressure accumulator.

In another aspect, the filling operation is performed during at least one of (a) a reaction period in which reagents react with the biological or chemical sample in the flow cell or (b) an offline period in which the pressure accumulator is not in flow communication with the system pump.

In another aspect, the flow-control system also includes first and second valves. The first valve is positioned between the fluid reservoir and the pressure accumulator. The second valve is positioned between the pressure accumulator and the flow cell. The first valve is in an open state and the second valve is in a closed state during the filling operation. The first valve is in a closed state and the second valve is in an open state during the pressure-assist operation. Optionally, the first valve is in a closed state and the second valve is in an open state during a recycling operation in which the movable chamber wall causes the fluid to flow from the flow cell back into the interior chamber.

In another aspect, the interior chamber is defined by a body surface, wherein at least one of the chamber wall and the body surface has a discontinuity section that defines a flow channel between the chamber wall and the body surface.

Optionally, the chamber wall has the discontinuity section. The discontinuity section of the chamber wall may include at least one of (a) a support member that shapes the discontinuity section; (b) an increased thickness in the chamber wall; (c) or a molded three-dimensional shape. Optionally, the body surface has the discontinuity section. The discontinuity section may include a groove that is shaped by the body surface.

In another aspect, the interior chamber is defined by a body surface. The chamber wall and the body surface are shaped relative to each other such that a flow channel is formed therebetween when the chamber wall is at a maximum displacement In another aspect, the interior chamber is defined by a body surface. The chamber wall and the body surface are shaped relative to each other such that respective areas of the chamber wall and the body surface press against each other and other areas of the chamber wall and the body surface have a flow channel therebetween.

In another aspect, the flow-control system also includes a flow sensor. The wall actuator is configured to (a) move the chamber wall at designated times or (b) move the chamber wall at different rates. The designated times or different rates are based on a pressure of the fluid within the flow-control system.

In another aspect, the flow-control system also includes a plurality of interior chambers and a plurality of chamber walls that define respective interior chambers. The wall actuator is configured to move at least two of the chamber walls at different times.

In an embodiment, a pressure accumulator is provided that include a main body having an inlet, an outlet, and an interior chamber. The inlet and the outlet are in flow communication with each other through the interior chamber. The interior chamber is defined by a body surface. The pressure accumulator also includes a chamber wall that also defines the interior chamber. The pressure accumulator also includes a wall actuator that is configured to move the chamber wall to different positions relative to the body surface to change an operating volume of the interior chamber. The chamber wall is configured to move between a retracted position and a displaced position. The operating volume of the interior chamber is greater in the retracted position than in the displaced position. The chamber wall and the body surface are shaped relative to each other to define a flow channel therebetween when the chamber wall is in the displaced position. The flow channel fluidly couples the inlet and the outlet.

In one aspect, at least one of the chamber wall and the body surface has a discontinuity section that defines the flow channel between the chamber wall and the body surface. Optionally, the discontinuity section includes an abrupt change in a contour of the chamber wall or the body surface. Optionally, the chamber wall has the discontinuity section. The discontinuity section of the chamber wall includes at least one of (a) a support member that shapes the discontinuity section; (b) an increased thickness in the chamber wall; (c) or a molded three-dimensional shape. Optionally, the body surface has the discontinuity section. The discontinuity section includes a groove shaped by the body surface.

In another aspect, the chamber wall and the body surface are shaped relative to each other such that the flow channel is formed therebetween when the chamber wall is at a maximum displacement.

In another aspect, the chamber wall and the body surface are shaped relative to each other such that respective areas of the chamber wall and the body surface press against each other and other areas of the chamber wall and the body surface have the flow channel therebetween.

In another aspect, the flow channel has a substantially uniform cross-sectional area between the inlet and the outlet.

In another aspect, the inlet and outlet have respective cross-sectional areas. The flow channel has a cross-sectional area that is substantially equal to at least one of the inlet or outlet cross-sectional areas. Optionally, the cross-sectional area of the flow channel is within 35% of the cross-sectional area of the inlet and the cross-sectional area of the outlet.

In an embodiment, a method of delivering fluid to a flow cell is provided. The method includes fluidly coupling a flow cell to a loading zone of a flow-control system. The flow-control system includes a fluid reservoir that stores a fluid, a pressure accumulator that is fluidly coupled between the fluid reservoir and the flow cell, and a system pump that is in flow communication with and positioned downstream from the flow cell. The method includes inducing a flow of the fluid from the fluid reservoir and through the pressure accumulator and the flow cell using the system pump. The method also includes boosting a pressure of the fluid within the flow-control system using the pressure accumulator.

In one aspect, the method includes performing an SBS protocol.

BRIEF DESCRIPTION OF THE DRAWINGS

FIG. 20 is a schematic diagram of a flow-control system in accordance with an embodiment.

FIG. 21 is a schematic diagram of the flow-control system of FIG. 20 during a designated flow-control operation.

DETAILED DESCRIPTION

Figure 1:
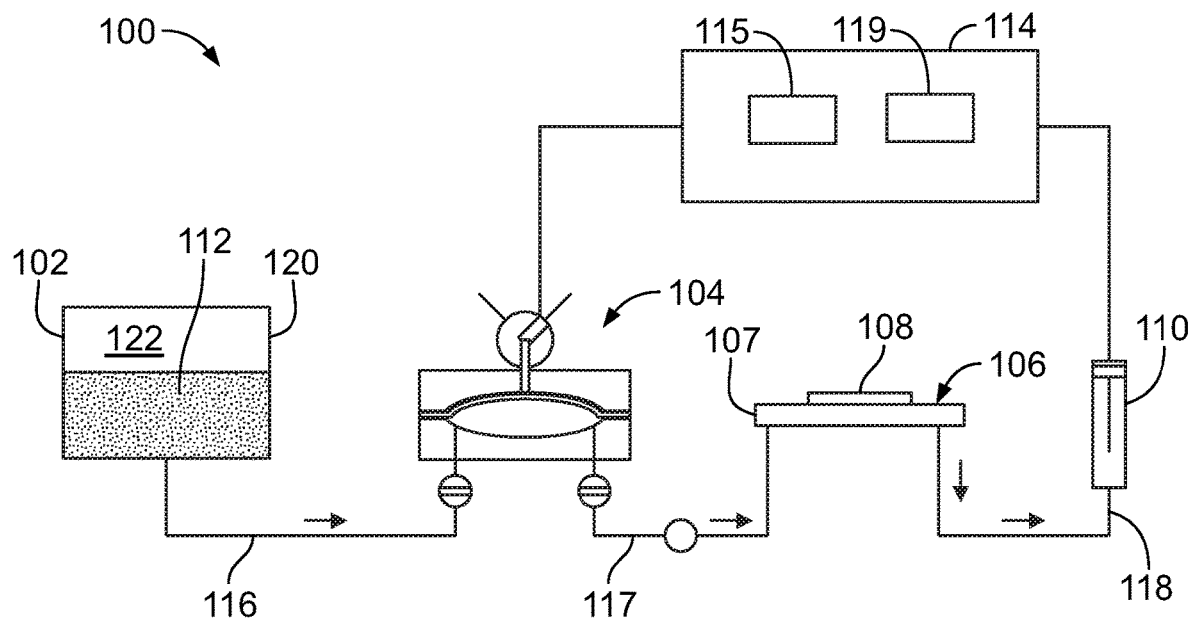
FIG. 1 is a schematic diagram of a flow-control system formed in accordance with an embodiment.

Embodiments set forth herein include pressure accumulators, flow-control systems having pressure accumulators, and methods that utilize pressure accumulators. The pressure accumulator is fluidly disposed between a fluid reservoir, such as a reagent reservoir, and a system pump. The system pump is configured to induce the flow of fluid through the flow-control system. The pressure accumulator is configured to (a) offset a pressure drop in fluidic line(s) of the system between the pressure accumulator and the system pump; (b) maintain the pressure in the fluidic line(s); and/or (c) increase the pressure in the fluidic line(s). As such, the pressure accumulator may enable faster reagent delivery to flow cells compared to other known systems. Decreasing the time for reagents to arrive to the flow cell may decrease the time for each cycle. As described above, sessions (e.g., sequencing runs) typically include numerous cycles (e.g., tens, hundreds, or thousands). Accordingly, if the time for each cycle is reduced, the time for each session may be reduced by minutes or potentially hours. Alternatively, embodiments may allow longer incubation times for certain biochemical processes.

Embodiments set forth herein may include the accuracy of system pumps (e.g., syringe pumps) while enabling a quicker delivery of reagents to the designated space. For example, the pressure accumulator may reduce the maximum pressure drop that may limit the capability of syringe pump delivery. Embodiments may also reduce the risk of gassing or degassing the reagents while enabling a quicker delivery of reagents to the designated space.

In some embodiments, the flow-control system may include a plurality of pressure accumulators that are coupled to one another in a sub-assembly of the flow-control system. The sub-assembly may be added to legacy systems or incorporated with newer flow-control systems. Moreover, the pressure accumulators may be interconnected to one another and/or interconnected to other lines of the flow-control system in complex arrays or matrices to provide sufficient delivery of fluids to the flow cells.

In some embodiments, the elements of the pressure accumulators may be machined, injection molded, 3D printed, or a combination thereof. The pressure accumulators may be designed and assembled to increase the robustness and decrease service requirements. In some cases, the pressure accumulators can be designed in such a way that high wear components are easily serviceable and replaceable. Moreover, the sub-assembly described above can be designed in a scalable fashion such that increasing or decreasing the number of pressure accumulators in the array may make the subassembly suitable for many platforms.

Some embodiments may enable scaling of sequencing reagent volumes up to industrial sizes. For example, the pressure accumulator may only receive small amounts (e.g., less than one milliliter, two milliliters, five milliliters) of fluid and deliver them in a cyclic pattern. As such, the reagent source may be as large as required for numerous cycles or numerous sessions. This would be impractical for systems in which the reagent source is pressurized, due to the large volumes (tens or hundreds of liters) and resultant forces over such large surface areas (hundreds of pounds).

As used herein, the term "assay protocol" includes a sequence of operations for conducting designated reactions, detecting designated reactions, and/or analyzing designated reactions. The operations of an assay protocol may include fluidic operations, thermal-control operations, detection operations, and/or mechanical operations. A fluidic operation includes controlling the flow of fluid (e.g., liquid or gas) through the carrier assembly or the assay system. For example, a fluidic operation may include controlling a pump to induce flow of the biological sample or a reaction component into a reaction chamber. A thermal-control operation may include controlling a temperature of a designated portion the carrier assembly or assay system. By way of example, a thermal-control operation may include raising or lowering a temperature of the reaction chamber in order to conduct or facilitate certain reactions. A detection operation may include controlling activation of a detector or monitoring activity of the detector to detect predetermined properties, qualities, or characteristics of the sample. As one example, the detection operation may include capturing images of a designated area that includes the biological sample to detect fluorescent emissions from the designated area. The detection operation may include controlling a light source to illuminate the biological sample. A mechanical operation may include controlling a movement or position of a designated component. For example, a mechanical operation may include controlling a motor to move a robotic arm of an assay system. In some cases, a combination of different operations may occur concurrently.

As used herein, the term "sample" includes any substance that is capable of being modified (e.g., through a controlled reaction) or observed in a reaction chamber, such as those described herein. In particular embodiments, samples may include biological or chemical substances of interests. As used herein, the term "biological or chemical sample" or "biological or chemical substances" may include a variety of biological samples or chemical samples that are suitable for being observed (e.g., imaged) or examined. For example, biological or chemical samples include biomolecules, nucleosides, nucleic acids, polynucleotides, oligonucleotides, proteins, enzymes, polypeptides, antibodies, antigens, ligands, receptors, polysaccharides, carbohydrates, polyphosphates, nanopores, organelles, lipid layers, cells, cell lysates, tissues, organs, organisms, bodily fluids. The terms "biological or chemical sample" may include biologically active chemical compound(s), such as analogs or mimetics of aforementioned species. The term "biological sample," as used herein, may include samples such as cell lysates, intact cells, organisms, organs, tissues and bodily fluids. "Bodily fluids" may include, but are not limited to, blood, dried blood, clotted blood, serum, plasma, saliva, cerebral spinal fluid, pleural fluid, tears, lactal duct fluid, lymph, sputum, urine, amniotic fluid, and semen. A sample may include a bodily fluid that is "acellular." An "acellular bodily fluid" includes less than about 1% (w/w) whole cellular material. Plasma or serum are examples of acellular bodily fluids. A sample may include a specimen of natural or synthetic origin (i.e., a cellular sample made to be acellular). In some embodiments, the biological sample can be from a human or from a non-human origin. In some embodiments, the biological sample can be from a human patient. In some embodiments, the biological sample can be from a newborn human.

Embodiments of the present fluidic systems and methods find particular use for nucleic acid sequencing techniques.

For example, sequencing-by-synthesis (SBS) protocols are particularly applicable. In SBS, extension of a nucleic acid primer along a nucleic acid template is monitored to determine the sequence of nucleotides in the template. The underlying chemical process can be polymerization (e.g. as catalyzed by a polymerase enzyme) or ligation (e.g. catalyzed by a ligase enzyme). In a particular polymerase-based SBS embodiment, fluorescently labeled nucleotides are added to a primer (thereby extending the primer) in a template dependent fashion such that detection of the order and type of nucleotides added to the primer can be used to determine the sequence of the template. A plurality of different templates can be subjected to an SBS technique on a surface under conditions where events occurring for different templates can be distinguished. For example, the templates can be present on the surface of an array such that the different templates are spatially distinguishable from each other. Typically the templates occur at features each having multiple copies of the same template (sometimes called "clusters" or "colonies"). However, it is also possible to perform SBS on arrays where each feature has a single template molecule present, such that single template molecules are resolvable one from the other (sometimes called "single molecule arrays").

Flow cells provide a convenient substrate for housing an array of nucleic acids. Flow cells are convenient for sequencing techniques because the techniques typically involve repeated delivery of reagents in cycles. For example, to initiate a first SBS cycle, one or more labeled nucleotides, DNA polymerase, etc., can be flowed into/through a flow cell that houses an array of nucleic acid templates. Those features where primer extension causes a labeled nucleotide to be incorporated can be detected, for example, using methods or apparatus set forth herein. Optionally, the nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for embodiments that use reversible termination a deblocking reagent can be delivered to the flow cell (before or after detection occurs). Washes can be carried out between the various delivery steps. The cycle can then be repeated n times to extend the primer by n nucleotides, thereby detecting a sequence of length n. Exemplary sequencing techniques are described, for example, in Bentley et al., *Nature* 456: 53-59 (2008), WO 04/018497; U.S. Pat. No. 7,057,026; WO 91/06678; WO 07/123,744; U.S. Pat. Nos. 7,329,492; 7,211,414; 7,315,019; 7,405,281, and US 2008/0108082, each of which is incorporated herein by reference.

For the nucleotide delivery step of an SBS cycle, either a single type of nucleotide can be delivered at a time, or multiple different nucleotide types (e.g. A, C, T and G together) can be delivered. For a nucleotide delivery configuration where only a single type of nucleotide is present at a time, the different nucleotides need not have distinct labels since they can be distinguished based on temporal separation inherent in the individualized delivery. Accordingly, a sequencing method or apparatus can use single color detection. For example, a microfluorometer or read head need only provide excitation at a single wavelength or in a single range of wavelengths. Thus, a microfluorometer or read head need only have a single excitation source and multiband filtration of excitation need not be necessary. For a nucleotide delivery configuration where delivery results in multiple different nucleotides being present in the flow cell at one time, features that incorporate different nucleotide types can be distinguished based on different fluorescent labels that are attached to respective nucleotide types in the mixture. For example, four different nucleotides can be used, each having one of four different fluorophores. In one embodiment the four different fluorophores can be distinguished using excitation in four different regions of the spectrum. For example, a microfluorometer or read head can include four different excitation radiation sources. Alternatively a read head can include fewer than four different excitation radiation sources but can utilize optical filtration of the excitation radiation from a single source to produce different ranges of excitation radiation at the flow cell.

In some embodiments, four different nucleotides can be detected in a sample (e.g. array of nucleic acid features) using fewer than four different colors. As a first example, a pair of nucleotide types can be detected at the same wavelength, but distinguished based on a difference in intensity for one member of the pair compared to the other, or based on a change to one member of the pair (e.g. via chemical modification, photochemical modification or physical modification) that causes apparent signal to appear or disappear compared to the signal detected for the other member of the pair. As a second example, three of four different nucleotide types can be detectable under particular conditions while a fourth nucleotides type lacks a label that is detectable under those conditions. In an SBS embodiment of the second example, incorporation of the first three nucleotide types into a nucleic acid can be determined based on the presence of their respective signals, and incorporation of the fourth nucleotide type into the nucleic acid can be determined based on absence of any signal. As a third example, one nucleotide type can be detected in two different images or in two different channels (e.g. a mix of two species having the same base but different labels can be used, or a single species having two labels can be used or a single species having a label that is detected in both channels can be used), whereas other nucleotide types are detected in no more than one of the images or channels. In this third example, comparison of the two images or two channels serves to distinguish the different nucleotide types.

The three exemplary configurations in the above paragraph are not mutually exclusive and can be used in various combinations. An exemplary embodiment is an SBS method that uses reversibly blocked nucleotides (rbNTPs) having fluorescent labels. In this format, four different nucleotide types can be delivered to an array of nucleic acid features that are to be sequenced and due to the reversible blocking groups one and only one incorporation event will occur at each feature. The nucleotides delivered to the array in this example can include a first nucleotide type that is detected in a first channel (e.g. rbATP having a label that is detected in the first channel when excited by a first excitation wavelength), a second nucleotide type that is detected in a second channel (e.g. rbCTP having a label that is detected in the second channel when excited by a second excitation wavelength), a third nucleotide type that is detected in both the first and the second channel (e.g. rbTTP having at least one label that is detected in both channels when excited by the first and/or second excitation wavelength) and a fourth nucleotide type that lacks a label that is detected in either channel (e.g. rbGTP having no extrinsic label).

Once the four nucleotide types have been contacted with the array in the above example, a detection procedure can be carried out, for example, to capture two images of the array. The images can be obtained in separate channels and can be obtained either simultaneously or sequentially. A first image obtained using the first excitation wavelength and emission in the first channel will show features that incorporated the first and/or third nucleotide type (e.g. A and/or T). A second image obtained using the second excitation wavelength and emission in the second channel will show features that incorporated the second and/or third nucleotide type (e.g. C and/or T). Unambiguous identification of the nucleotide type incorporated at each feature can be determined by comparing the two images to arrive at the following: features that show up only in the first channel incorporated the first nucleotide type (e.g. A), features that show up only in the second channel incorporated the second nucleotide type (e.g. C), features that show up in both channel incorporated the third nucleotide type (e.g. T) and features that don't show up in either channel incorporated the fourth nucleotide type (e.g. G). Note that the location of the features that incorporated G in this example can be determined from other cycles (where at least one of the other three nucleotide types is incorporated). Exemplary apparatus and methods for distinguishing four different nucleotides using detection of fewer than four colors are described for example in U.S. Pat. App. Ser. No. 61/538,294, which is incorporated herein by reference.

In some embodiments, nucleic acids can be attached to a surface and amplified prior to or during sequencing. For example, amplification can be carried out using bridge amplification to form nucleic acid clusters on a surface. Useful bridge amplification methods are described, for example, in U.S. Pat. No. 5,641,658; US 2002/0055100; U.S. Pat. No. 7,115,400; US 2004/0096853; US 2004/0002090; US 2007/0128624; or US 2008/0009420, each of which is incorporated herein by reference. Another useful method for amplifying nucleic acids on a surface is rolling circle amplification (RCA), for example, as described in Lizardi et al., *Nat. Genet.* 19: 225-232 (1998) and US 2007/0099208 A1, each of which is incorporated herein by reference. Emulsion PCR on beads can also be used, for example as described in Dressman et al., *Proc. Natl. Acad. Sci. USA* 100: 8817-8822 (2003), WO 05/010145, US 2005/0130173 or US 2005/0064460, each of which is incorporated herein by reference.

Exemplary SBS systems and methods which can be utilized with the methods and systems described herein are described in U.S. Pat. Nos. 7,541,444, 7,566,537, 7,057,026, 8,460,910, 8,623,628, International Patent Pub. No. WO 05/065814, U.S. Pat. No. 7,985,565, International Patent Pub. No. WO 06/064199, International Patent Pub. No. WO 07/010,251, U.S. Patent Pub. No. 2012/0270305 and U.S. Patent Pub. No. 2013/0260372, each of which are incorporated herein by reference in its entirety.

As set forth above, sequencing embodiments are an example of a repetitive process. The methods of the present disclosure are well suited to repetitive processes. Some embodiments are set forth below and elsewhere herein.

In particular embodiments, the sample substrates include a microarray. A microarray may include a population of different probe molecules that are immobilized to a surface of a substrate such that the different probe molecules can be differentiated from each other according to relative location. A microarray can include different probe molecules, or populations of the probe molecules, that are each located at a different addressable location on a substrate. Alternatively, a microarray can include separate optical substrates, such as beads, each bearing a different probe molecule, or population of the probe molecules, that can be identified according to the locations of the optical substrates on a surface to which the substrates are attached or according to the locations of the substrates in a liquid. Exemplary arrays in which separate substrates are located on a surface include, without limitation, a BeadChip Array available from Illumina Inc. (San Diego, Calif.) or others including beads in wells such as those described in U.S. Pat. Nos. 6,266,459, 6,355,431, 6,770,441, 6,859,570, and 7,622,294; and PCT Publication No. WO 00/63437, each of which is hereby incorporated by reference. Other arrays having particles on a surface include those set forth in US 2005/0227252; WO 05/033681; and WO 04/024328, each of which is hereby incorporated by reference.

Any of a variety of microarrays known in the art may be used. A typical microarray contains reaction sites, sometimes referred to as features, each having a population of probes. The population of probes at each reaction site is typically homogenous having a single species of probe, but in some embodiments the populations can each be heterogeneous. Reaction sites or features of an array are typically discrete, being separated with spaces between each other. The size of the probe sites and/or spacing between the reaction sites can vary such that arrays can be high density, medium density or lower density. High density arrays are characterized as having reaction sites separated by less than about 15 µm. Medium density arrays have reaction sites separated by about 15 to 30 µm, while low density arrays have reaction sites separated by greater than 30 µm. An array useful in the invention can have reaction sites that are separated by less than 100 µm, 50 µm, 10 µm, 5 µm, 1 µm, or 0.5 µm. An apparatus or method of an embodiment of the invention can be used to image an array at a resolution sufficient to distinguish sites at the above densities or density ranges.

Further examples of commercially available microarrays that can be used include, for example, an Affymetrix® GeneChip® microarray or other microarray synthesized in accordance with techniques sometimes referred to as VLSIPS. (Very Large Scale Immobilized Polymer Synthesis) technologies as described, for example, in U.S. Pat. Nos. 5,324,633; 5,744,305; 5,451,683; 5,482,867; 5,491,074; 5,624,711; 5,795,716; 5,831,070; 5,856,101; 5,858,659; 5,874,219; 5,968,740; 5,974,164; 5,981,185; 5,981,956; 6,025,601; 6,033,860; 6,090,555; 6,136,269; 6,022,963; 6,083,697; 6,291,183; 6,309,831; 6,416,949; 6,428,752 and 6,482,591, each of which is hereby incorporated by reference. A spotted microarray can also be used in a method according to an embodiment of the invention. An exemplary spotted microarray is a CodeLink™ Array available from Amersham Biosciences. Another microarray that is useful is one that is manufactured using inkjet printing methods such as SurePrint™ Technology available from Agilent Technologies. Any one of several assays can be used to identify or characterize targets using a microarray as described, for example, in U.S. Patent Application Publication Nos. 2003/0108867; 2003/0108900; 2003/0170684; 2003/0207295; or 2005/0181394, each of which is hereby incorporated by reference.

Although certain embodiments may be used for analyzing samples, it should be understood that other embodiments may be used to prepare samples for subsequent analysis. For example, embodiments may be used for preparing surfaces of the flow cells to include immobilized oligonucleotides. After the flow cell is prepared, the flow cell may be removed and analyzed by a separate system.

As used herein, the term "flow cell" includes any apparatus that has a channel that is capable of being fluidly coupled to the flow-control system. The flow cell is typically, although not required, removable from a loading zone or stage. A flow cell may include one or more flow channels that are visible through the flow cell body. In such embodiments, images of fluorescent emissions from the biological or chemical sample may be obtained by an external camera system. In other embodiments, the flow cell is part of a device that includes a CMOS imager. For instance, the flow cell may be positioned along a surface of the CMOS imager such that fluorescent emissions may be detected by pixels in the CMOS imager. In alternative embodiments, however, the biological or chemical sample does not provide light signals. For example, embodiments may be configured for nanopore sequencing in which fluctuations of electrical conductance through nanopores are monitored. Flow cells may be manufactured through a variety of materials, such as glass, silicon, plastic, or a combination thereof.

As used herein, phrases such as "a plurality of [elements]" and "an array of [elements]" and the like, when used in the detailed description and claims, do not necessarily include each and every element that a component may have. The component may have other elements that are similar to the plurality of elements. For example, the phrase "a plurality of reaction chambers [being/having a recited feature]" does not necessarily mean that each and every reaction chamber of the component has the recited feature. Other reaction chambers may not include the recited feature. Accordingly, unless explicitly stated otherwise (e.g., "each and every reaction chamber [being/having a recited feature]"), embodiments may include similar elements that do not have the recited features.

FIG. 1 is schematic illustration of a flow-control system 100 formed in accordance with an embodiment. The flow-control system 100 includes a fluid reservoir 102, a pressure accumulator 104, a loading zone 106 that is configured to receive and fluidly couple to a flow cell 108, and a system pump 110. It should be understood that the flow-control system 100 may include additional components. As shown in FIG. 1, the pressure accumulator 104 is positioned downstream from the fluid reservoir 102, the loading zone 106 is positioned downstream from the pressure accumulator 104, and the system pump 110 is positioned downstream from the loading zone 106. The system pump 110 is configured to induce flow of a fluid 112 from the fluid reservoir 102 and through the pressure accumulator 104 and the loading zone 106 when the flow cell 108 is mounted thereto.

As described herein, the pressure accumulator 104 is configured to assist the system pump 110 in delivering the fluid from the fluid reservoir 102 to the flow cell 108. In some embodiments, the pressure accumulator 104 is configured to offset pressure drops that may occur as the fluid flows from the fluid reservoir 102 to the flow cell 108. For example, the pressure accumulator 104 may reduce the size of the pressure drop, may prevent the pressure drop entirely, or may increase the system pressure.

The various components of the flow-control system 100 are fluidly coupled to one another through fluidic lines 116-118. Each fluidic line may include one or more channels that are formed, for example, by flexible tubes or rigid bodies that are shaped (e.g., molded, etched, etc.) to define the channel. In some embodiments, a single body may define multiple fluidic lines. For example, a manifold may be molded to define the fluidic lines 116 and 117.

Although the system pump 110 is described as being located downstream from the other components of the flow-control system 100, it should be understood that embodiments are not required to direct flow toward the system pump 110 at all times. For example, in some embodiments, fluid may flow from the flow cell 108 into the pressure accumulator 104, such as during reagent recycling operations. In some embodiments, fluid may be directed from the system pump 110 toward the fluid reservoir 102, such as during a purging or cleaning protocol. It is also contemplated that the system pump 110 and the pressure accumulator 104 may switch functions. For example, the pressure accumulator 104 may be configured to draw liquid from the flow cell 108 into the pressure accumulator 104 as the system pump 110 induces flow toward the pressure accumulator 104.

The fluid reservoir 102 includes a container 120 that defines a storage chamber 122 for storing the fluid 112. The fluid 112 may include one or more reactants or reagents for carrying out a designated assay. In some embodiments, the fluid 112 is used to carry out an SBS protocol. For example, the fluid 112 may include nucleotide monomers and polymerase, fluorescent labels that are configured to attach to the nucleotides, and/or reagents for cleaving the fluorescent labels. In some embodiments, the fluid reservoir 102 is a removable unit that may be replaced after the fluid 112 is consumed or used. The storage chamber 122 may have a volume that is sufficient for carrying out numerous cycles. For example, the storage chamber 122 may hold 100 milliliter (ml) or more. In some embodiments, the storage chamber 122 is configured to hold 500 ml or more. In some embodiments, the storage chamber 122 is configured to hold at least one liter. However, it should be understood that embodiments are not limited to certain volumes and volumes that are less than or more than those expressed above may be used.

The loading zone 106 is a region or space that is configured to have the flow cell 108 disposed therein. In particular embodiments, the loading zone 106 includes a loading stage 107 have a mounting area for receiving a side of the flow cell 108. For example, the loading stage 107 may have ports that open to the mounting area and are configured to fluidly couple to ports of the flow cell 108. In other embodiments, however, the loading zone 106 does not include a stage. For example, the flow cell may be a column that is suspended in space and supported at each end by the fluidic lines that attach to the column.

The system pump 110 may be any pump that is capable of inducing flow of a fluid through the flow-control system 100. For example, the system pump 110 may be one or more syringe pumps. Alternatively or in addition to the syringe pump, the system pump 110 may include a positive or negative pressure pump, peristaltic pump, diaphragm pump, piston pump, gear pump, or Archimedes screw.

It should also be understood that FIG. 1 illustrates only one example of embodiments supported by the present application. For example, other embodiments may include a plurality of fluid reservoirs, a plurality of pressure accumulators, a plurality of flow cells, and/or a plurality of system pumps.

Components of the flow-control system 100 may be selectively controlled by a computing system 114 having one or more processing units 115. As used herein, a "processing unit" includes processing circuitry configured to perform one or more tasks, functions, or steps, such as those described herein. For instance, the processing unit may be a logic-based device that performs operations based on instructions stored on a tangible and non-transitory computer readable medium 119, such as memory. For example, the processing unit may selectively control the system pump 110 to induce flow of the fluid through the flow-control system 100 and selectively control the pressure accumulator 104 to assist the system pump 110 in delivering the fluid to the flow cell 108.

The following describes features, functions, components, and operations of flow-control systems, which may include pressure accumulators, pumps, and valves, among other things. It should be understood that the processing unit 115 may be configured to control operation of these components. For example, the processing unit 115 may be configured to control operation of the system pump and the pressure accumulator in accordance with a predetermined schedule. Optionally, the predetermined schedule may include repeating a filling operation and a pressure-assist operation at least ten times. In certain embodiments, the processing unit may be configured to control operation of the system pump and the pressure accumulator in accordance with a sequencing-by-synthesis (SBS) protocol. In certain embodiments, the processing unit may be configured to control operation of the system pump and the pressure accumulator to perform a recycling operation in which the fluid from the flow cell is drawn back to the interior chamber of the pressure accumulator.

It is noted that "processing unit," as used herein, is not intended to necessarily be limited to a single processor or single logic-based device. For example, the processing unit may include a single processor (e.g., having one or more cores), multiple discrete processors, one or more application specific integrated circuits (ASICs), and/or one or more field programmable gate arrays (FPGAs). In some embodiments, the processing unit is an off-the-shelf device that is appropriately programmed or instructed to perform operations, such as the algorithms described herein.

The processing unit 115 may also be a hard-wired device (e.g., electronic circuitry) that performs the operations based on hard-wired logic that is configured to perform the algorithms described herein. Accordingly, the processing unit may include one or more ASICs and/or FPGAs. Alternatively or in addition to the above, the processing unit may include or may be associated with a tangible and non-transitory memory having stored thereon instructions configured to direct the processing unit to perform the algorithms described herein. The instructions or algorithms may be executed within a commercially reasonable time period. In the exemplary embodiment, the processing unit executes a set of instructions that are stored in one or more storage elements, memories, or modules in order to at least one of obtain and analyze detection data. Storage elements may be in the form of information sources or physical memory elements within the computing system 114. Embodiments include non-transitory computer-readable media that include set of instructions for performing or executing one or more processes set forth herein. Non-transitory computer readable media may include all computer-readable media, except for transitory propagating signals per se. The non-transitory computer readable media may include generally any tangible computer-readable medium including, for example, persistent memory such as magnetic and/or optical disks, ROM, and PROM and volatile memory such as RAM. The computer-readable medium may store instructions for execution by one or more processors.

The computing system 114 may be connected to the other components or sub-systems of the system 100 via communication links, such as the lines that couple to the pressure accumulator 104 and the system pump 110. The communication links may be hardwired or wireless. The computing system 114 may receive user inputs or commands, from a user interface of the computing system 114. Such user input devices may include a keyboard, mouse, a touch-screen panel, and/or a voice recognition system, and the like.

Figure 2:
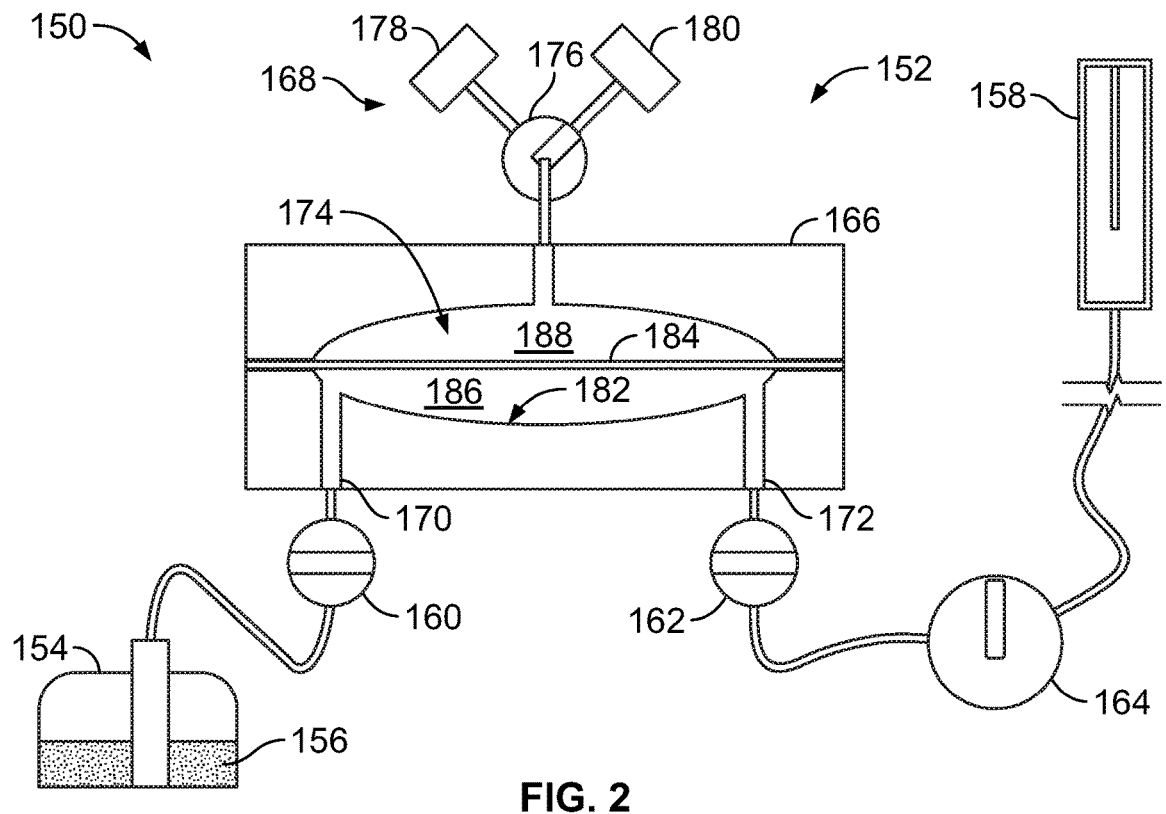
FIG. 2 is a schematic diagram of a flow-control system that illustrates a pressure accumulator in accordance with an embodiment.

FIG. 2 is a schematic diagram of a flow-control system 150 formed in accordance with an embodiment and also illustrates a pressure accumulator 152 in greater detail. In addition to the pressure accumulator 152, the flow-control system 150 includes a fluid reservoir 154 that is configured to store a fluid 156. Also shown, the flow-control system 150 includes a system pump 158, which is illustrated as a syringe pump, but may be other types of pumps in other embodiments. For illustrative purposes, the flow cell is not shown. The flow-control system 150 also includes a first valve 160 that is fluidly positioned between the fluid reservoir 154 and the pressure accumulator 152 and a second valve 162 that is fluidly positioned between the pressure accumulator 152 and the system pump 158 (and the flow cell). The flow-control system 150 also includes a system valve 164.

In an exemplary embodiment, the first and second valves 160, 162 are multi-valves. For example, the first and second valves 160, 162 may be two-way valves that are capable of allowing flow of the fluid in either direction through the valve. In other embodiments, however, the first valve 160 and/or the second valve 162 are only capable of allowing flow in one direction.

In other embodiments, the first valve 160, the second valve 162, the system valve 164, and/or other valves (e.g., valves 502) described herein may be rotary valves (or rotatable valves). Rotary valves may have rotatable bodies with one or more inlets and one or more outlets. Each inlet may be in flow communication with one or more outlets through a flow channel or channels of the rotatable body, and each outlet may be in flow communication with one or more inlets through a flow channel or channels of the rotatably body. The rotatable body may be rotated to align the inlets and/or outlets with respective fluidic lines of the system. For example, a rotary valve may be capable of selectively coupling a plurality of reservoirs 154 to a common inlet (e.g., inlet 170). Rotary valves similar to these are described in international publication nos. WO 2015/187868 (published on Oct. 12, 2015) and WO 2014/143010 (published on Sep. 18, 2014), each of which is incorporated herein by reference in its entirety.

The pressure accumulator 152 includes a main body 166 and a wall actuator 168 that is operably coupled to the main body 166. The main body 166 includes an inlet (or first port) 170, an outlet (or second port) 172, and a body cavity 174. The inlet 170 and the outlet 172 are in flow communication with each other through the body cavity 174. In the illustrated embodiment, the main body 166 includes only a single inlet 170, a single outlet 172, and a single body cavity 174. It is contemplated, however, that other embodiments may include more than one inlet, more than one outlet, and/or more than one interior chamber.

In the illustrated embodiment, the wall actuator 168 includes a multi-valve 176 and first and second pressure sources 178, 180. As shown, the first and second sources 178, 180 appear to be separate components. In other embodiments, however, the first and second pressure sources 178, 180 may be provided by a single component. The wall actuator 168 is configured to selectively control the multi-valve 176 and the first and second pressure sources 178, 180 to provide air into or withdraw air from the body cavity 174 and thereby move a chamber wall 184.

The body cavity 174 is defined by an interior body surface 182 and also defined by the movable chamber wall 184. As used herein, the term "define" and like terms does not necessarily mean completely define. For example, the interior body surface 182 may only partially define the body cavity 174 (or portions of the body cavity 174) and the chamber wall 184 may only partially define the body cavity 174 (or portions thereof). In an exemplary embodiment, the chamber wall 184 is a flexible or elastic membrane that is capable of expanding when pressure is increased and returning to a designated shape when pressure is reduced. In such embodiments, the chamber wall 184 may be referred to as a membrane, diaphragm, or bladder.

The body cavity 174 may be configured in such a way that it utilizes a maximum displacement of the chamber wall 184. The chamber wall 184 may have various geometric shapes for various purposes. For example, the chamber wall 184 may be shaped to reduce high stresses on the chamber wall 184 and/or to reduce dead volume. As one example, the chamber wall 184 may be may be a flat sheet or pre-formed membrane. The chamber wall 184 may be have a predetermined shape that assists in reducing stresses from cyclic loading.

However, the chamber wall may not be flexible or elastic in other embodiments. For example, the chamber wall may be similar to piston that is moved within a structure that surrounds the piston. Alternatively, the membrane may be moved by a piston instead of being moved by a change in fluid pressure.

As shown, the body cavity 174 is divided into separate spaces or volumes by the chamber wall 184. In the illustrated embodiment, the chamber wall 184 divides the body cavity 174 into an interior chamber 186 and a control chamber 188. The interior chamber 186 is configured to receive the fluid 156 therein during operation of the flow-control system 150. The control chamber 188 does not receive the fluid 156. Instead, the control chamber 188 may receive a different fluid (e.g., gas, such as ambient air, or a working liquid) that causes the chamber wall 184 to move. In other embodiments, the chamber wall 184 does not divide the body cavity 174 into separate spaces. In such embodiments, the body cavity 174 may be entirely defined between the movable chamber wall 184 and the body surface 182.

In some embodiments, the body cavity 174 and/or the interior chamber 186 has an operating volume that is substantially less than the total volume of the fluid reservoir 154. For example, the operating volume (e.g., the volume to be supplied to the flow cell) may be less than 20 ml. In some embodiments, the operating volume may be less than 15 ml or less than 10 ml. In particular embodiments, the operating volume may be less than 9 ml, 8 ml, 7 ml, 6 ml, or 5 ml. Yet in more particular embodiments, the operating volume may be less than 4 ml, 3 ml, 2 ml, 1 ml, 0.5 ml, less than 0.3 ml, or less than 0.1 ml. Relative to the total volume of the fluid reservoir 154, the operating volume may be significantly smaller. For example, the operating volume may be less than 20% of the total volume of the fluid reservoir 154, less than 10% of the total volume, less than 5% of the total volume, or less than 1% of the total volume. In more particular embodiments, the operating volume may be less than 0.5% of the total volume of the fluid reservoir 154, less than 0.3% of the total volume, or less than 0.1% of the total volume. In some embodiments, the operating volume may be configured to provide fluid for a single cycle. For example, the operating volume may be configured to provide a nucleotide/polymerase mixture to a flow cell for a single sequencing cycle.

As described with respect to FIGS. 3-6, the actuator 168, the first and second valves 160, 162, the system valve 164 and/or the system pump 158 may be selectively controlled for filling the interior chamber 186 with the fluid 156 during a filling operation and displacing the fluid 156 from the interior chamber 186 thereby (a) offsetting a pressure drop in the fluidic line(s) between the pressure accumulator and the system pump; (b) maintaining the pressure in the fluidic line(s); and/or (c) increasing the pressure in the fluidic line(s). These components may be selectively controlled by a computing system, such as the computing system 114, to carry out a predetermined assay protocol. For example, the components may be selectively controlled to carry out one hundred cycles, two hundred cycles, three hundred cycles, or more of an SBS protocol. As described below, the components may be selectively controlled to re-use fluids. In some embodiments, the filling operation may be performed during at least one of (a) a reaction period in which reagents react with the biological or chemical sample in the flow cell or (b) an offline period in which the pressure accumulator 152 is not in flow communication with the system pump 158.

Figure 3:
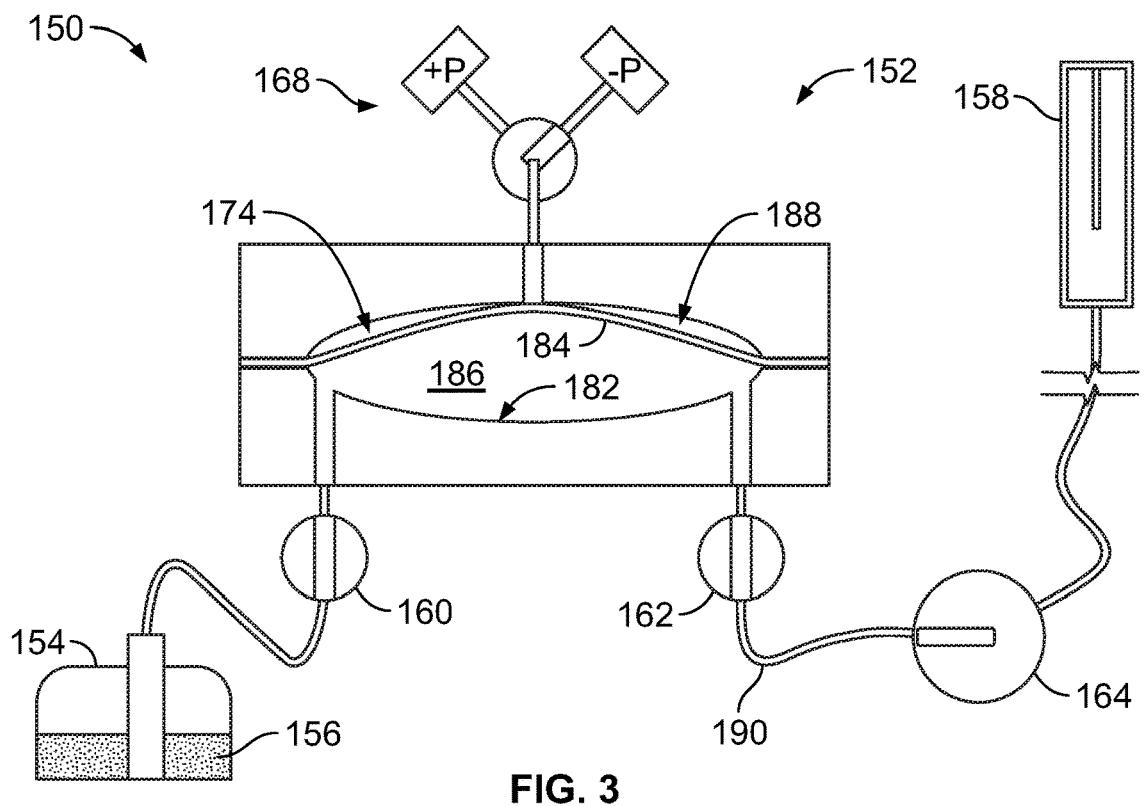
FIG. 3 is a schematic diagram of the flow-control system of FIG. 2 during a priming operation.

FIG. 3 illustrates a configuration of the flow-control system 150 during a priming operation. As shown, each of the first and second valves 160, 162 and the system valve 164 are in an "open" state such that fluid (the fluid 156 or other fluid) may flow therethrough. More specifically, the fluid 156 may flow from the fluid reservoir 154 to the pressure accumulator 152 through the first valve 160, the fluid 156 (or other fluid (e.g., gas)) in the pressure accumulator 152) may flow from the pressure accumulator 152 to a downstream fluidic line 190 through the second valve 162, and the fluid 156 (or other fluid in the fluidic line 190) may flow from the fluidic line 190 to a downstream fluidic component through the system valve 164. The downstream fluidic component may be, for example, the flow cell (not shown), the system pump 158, or any channel therebetween.

When the flow-control system 150 is in the configuration shown in FIG. 3, the fluid 156 may be primed (e.g., positioned for operation within the flow-control system 150). In this case, the fluid 156 may be drawn into the body cavity 174 and, more specifically, the interior chamber 186. The interior chamber 186 may be filled to its maximum volume or filled to another operating volume that is less than the maximum volume. To facilitate filling the interior chamber 186 to the operating volume, the actuator 168 may apply a negative pressure. More specifically, a working fluid (e.g., gas, such as ambient air, or a liquid) may be removed from the control chamber 188 thereby pulling or driving the chamber wall 184 away from the body surface 182 and increasing a volume of the interior chamber 186. As shown in FIG. 3, the chamber wall 184 is in a retracted position. In some embodiments, increasing the volume of the interior chamber 186 may generate a negative pressure that pulls the fluid 156 into the interior chamber 186. In other embodiments, however, the pressure accumulator 152 does not generate negative pressure to facilitate filling the interior chamber 186. In such embodiments, the interior chamber 186 may be filled with the fluid 156 by the system pump 158 drawing the fluid 156 through the flow-control system 150.

In some embodiments, the main body 166 may be oriented such that gas bubbles within the interior chamber may flow toward the outlet 172. For example, during the priming operation, gases within the interior chamber may flow in a direction against gravity to the top of the interior chamber where the outlet 172 is located.

Figure 4:
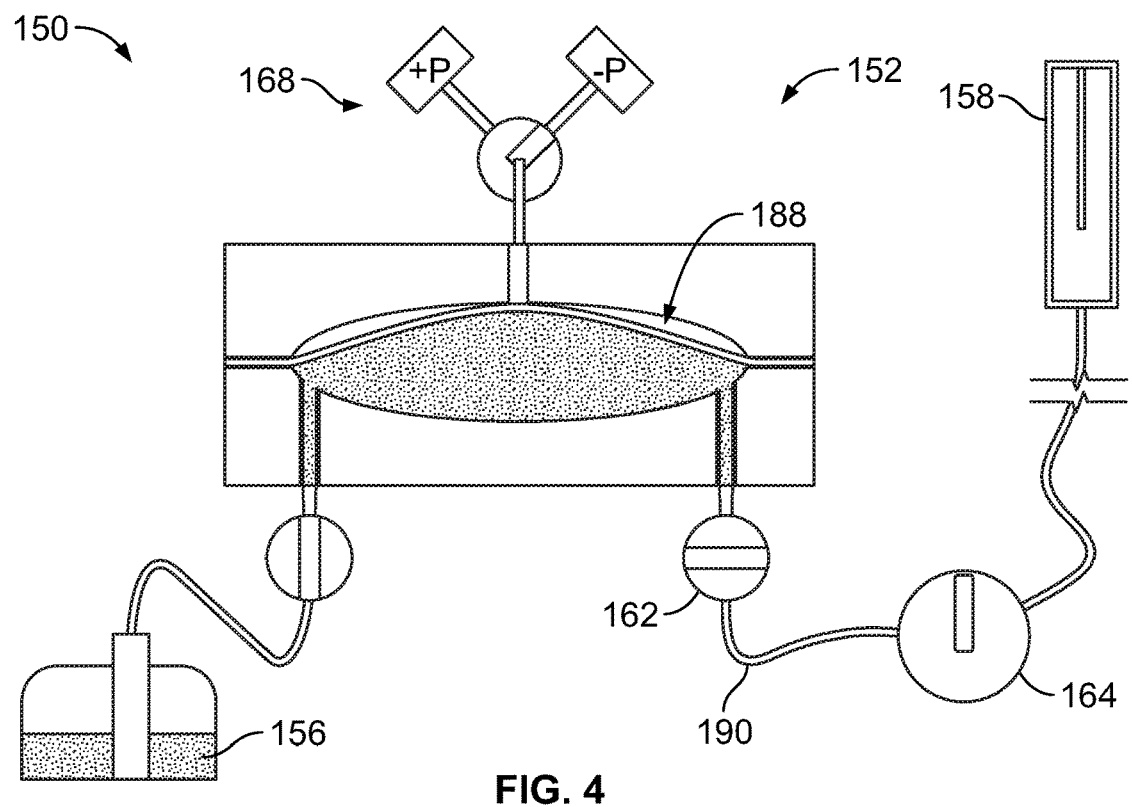
FIG. 4 is a schematic diagram of the flow-control system of FIG. 2 during a holding or storing operation.

FIG. 4 illustrates a configuration of the flow-control system 150 during a holding operation. More specifically, after the pressure accumulator 152 is primed using the configuration shown in FIG. 3, the second valve 162 may be closed such that the fluid 156 from the pressure accumulator 152 may not flow therethrough. Moreover, the actuator 168 may maintain the negative pressure within the control chamber 188. The system valve 164 may be closed with respect to the fluidic line 190. However, the system valve 164 may be open for other fluidic lines. More specifically, the system valve 164 may be a selector valve that is selectively controlled so that the system pump 158 is in flow communication with other lines. For example, when the flow-control system 150 is in the configuration shown in FIG. 4, the system pump 158 may be priming other fluidic components, such as other pressure accumulators (not shown).

In FIG. 4, the interior chamber 186 appears to have gaps between the fluid 156 and surfaces that define the interior chamber 186. It should be understood that the interior chamber 186 may be completely filled with fluid or liquid in FIG. 4. However, it is possible that the interior chamber 186 may include a negligible amount of gases.

Figure 5:
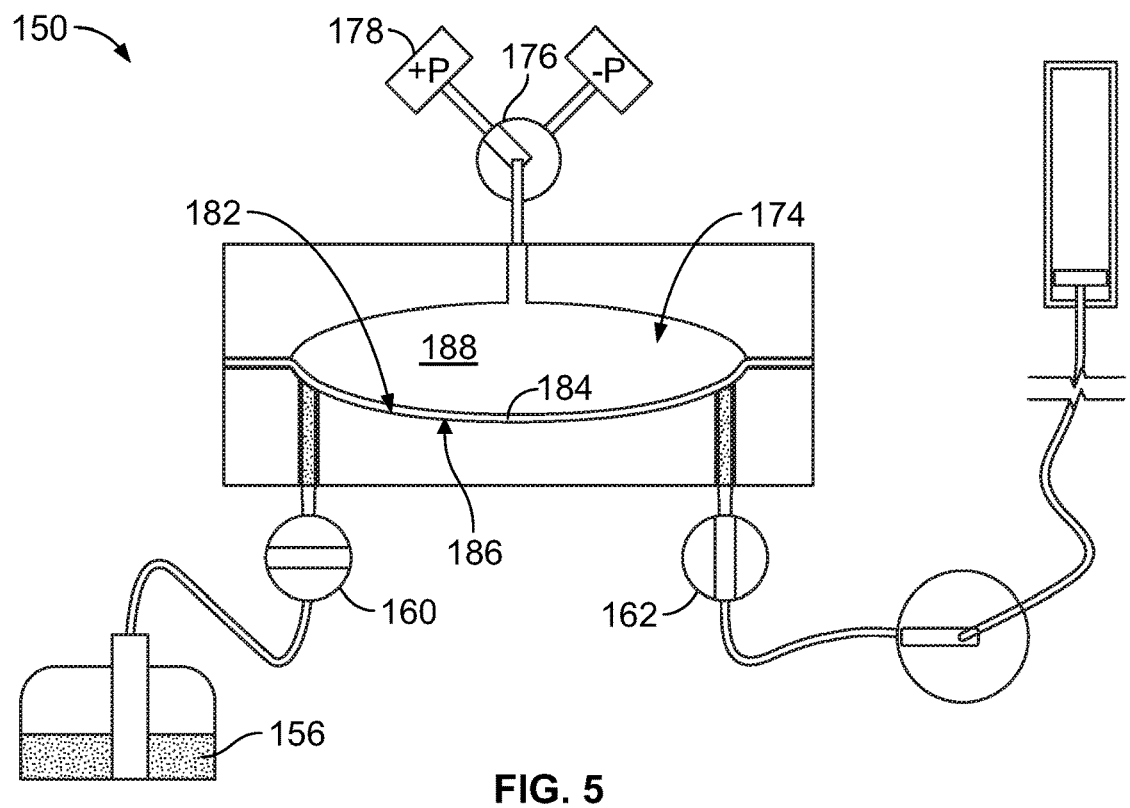
FIG. 5 is a schematic diagram of the flow-control system of FIG. 2 after a pressure-assist operation.

FIG. 5 illustrates a configuration of the flow-control system 150 upon completion of a pressure-assist operation. As shown, the first valve 160 has been moved to a closed state such that the fluid 156 may not flow therethrough, and the second valve 162 has been moved to an open state such that the fluid 156 was permitted to flow from the interior chamber 186 into the fluidic line 190 and the flow cell. The multi-valve 176 has been moved to allow the pressure source 178 to provide a positive pressure into the body cavity 174 (or the control chamber 188) thereby driving the chamber wall 184 toward the body surface 182. In FIG. 5, the chamber wall 184 is in a fully displaced position. In the fully displaced position, the chamber wall 184 may completely block or obstruct flow of the fluid 156 through the interior chamber 186. In other embodiments, however, the pressure accumulator 152 may form a flow channel that exists even when the chamber wall 184 is fully displaced. Embodiments with flow channels that exist when the chamber wall is fully displaced are described below.

Figure 6:
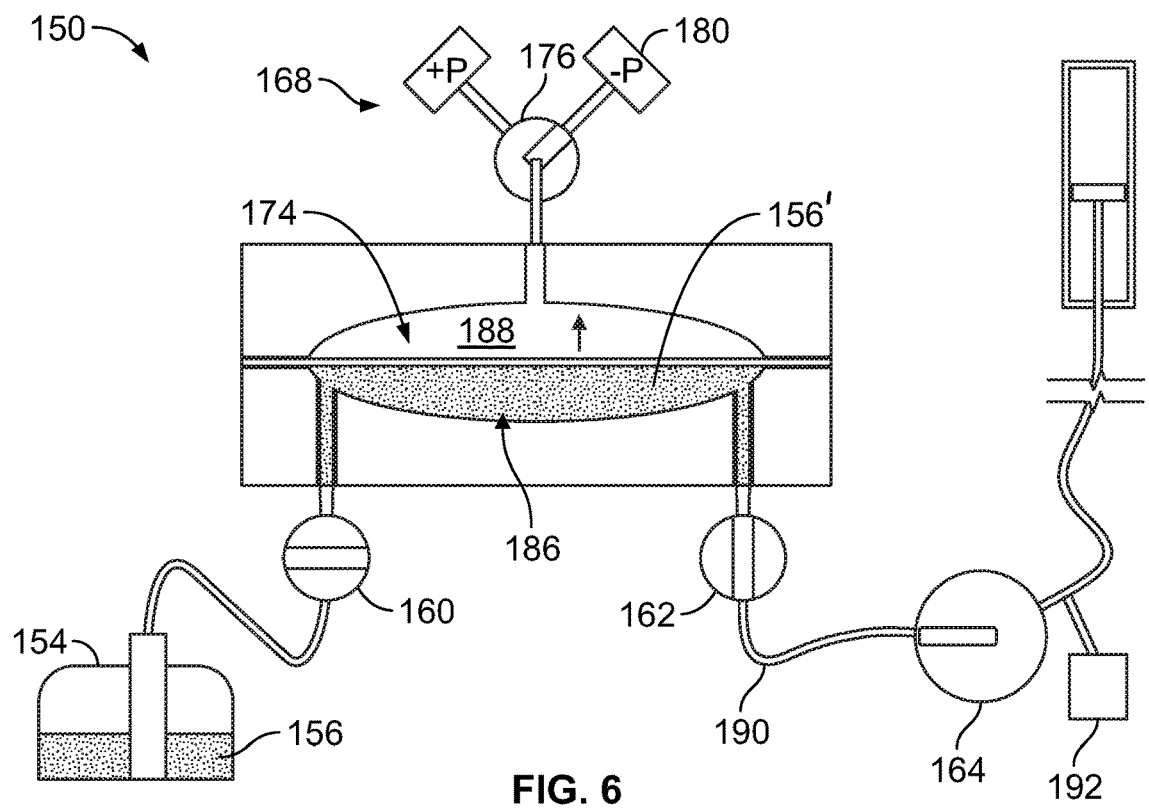
FIG. 6 is a schematic diagram of the flow-control system of FIG. 2 during a recycling operation.

FIG. 6 illustrates a configuration of the flow-control system 150 during a recycling operation. In some embodiments, the flow-control system 150 may be configured to re-use reactants (e.g., reagents). For example, the flow-control system can be configured to deliver a reagent to a flow cell, then remove the reagent from the flow cell, and then re-introduce the reagent to the flow cell. An advantage of re-using reagents is to reduce waste volume and reduce the cost of processes that utilize expensive reagents and/or reagents that are delivered at high concentrations (or in high amounts). Reagent re-use takes advantage of the understanding that depletion of reagent occurs only or primarily at the flowcell surface, and therefore a majority of the reagent goes unused and may be subject to re-use. For example, reagents such as enzymes (e.g., polymerase) and nucleotide monomers may be re-used during subsequent reactions. Systems and methods that re-use reagents are described in U.S. Patent Application Publication No. 2015/0045234, which is hereby incorporated by reference in its entirety.

As shown in FIG. 6, the first valve 160 is in a closed state such that the fluid 156 may not flow therethrough. The second valve 162 and the system valve 164 are in open states. The three-way valve 176 is positioned such that the pressure source 180 is in flow communication with the body cavity 174 or, more specifically, the control chamber 188. In this configuration, the pressure source 180 may move the chamber wall 184 away from the body surface 182 and thereby draw the fluid 156 from the flow cell and the fluidic line 190 into the interior chamber 186. Since the fluid 156 has already been present during a reaction period in which the reagents were permitted to react with the biological or chemical samples in the flow cell, the fluid 156 may be referred to as a cache fluid 156' (or used fluid). In some embodiments, this may be the entire recycling operation.

In other embodiments, however, FIG. 6 illustrates only the first stage of the recycling operation. The second stage of the recycling operation may be similar to the filling operation described with respect to FIG. 3. More specifically, the first valve 160 may be moved to the open state such that the fluid 156 may flow from the fluid reservoir 154 into the interior chamber 186 and the second valve 162 is closed such that the fluid 156 may not exit the interior chamber 186. When the first valve 160 is open and the second valve 162 is closed, the chamber wall 184 may be moved from the partially retracted (or partially displaced) position shown in FIG. 6. More specifically, the chamber wall 184 may be moved further away from the body surface 182 thereby drawing fluid 156 from the fluid reservoir 154 into the interior chamber 186. The unused fluid 156 may mix with the cache fluid 156'. The interior chamber 186 may be filled such that the interior chamber 186 has a designated operating volume, such as the operating volume shown in FIG. 4.

It should be understood that the amount at which the chamber wall is moved and the rate at which the chamber wall may be modified by, for example, the computing system 114. For example, the flow-control system 150 may include one or more flow sensors 192 that are configured to detect a pressure and/or flow rate of the fluid within the flow-control system 150. The flow sensor(s) 192 may communicate this data to the computing system 114. Based on the data obtained from the flow sensor(s) 192, the wall actuator 168 may be operated to at least one of (a) move the chamber wall at different designated times or (b) move the chamber wall at different rates.

In FIG. 6, the interior chamber 186 appears to have gaps between the fluid 156' and surfaces that define the interior chamber 186. It should be understood that the interior chamber 186 may be completely filled with fluid or liquid 156' in FIG. 6. However, it is possible that the interior chamber 186 may include a negligible amount of gases.

Figure 7:
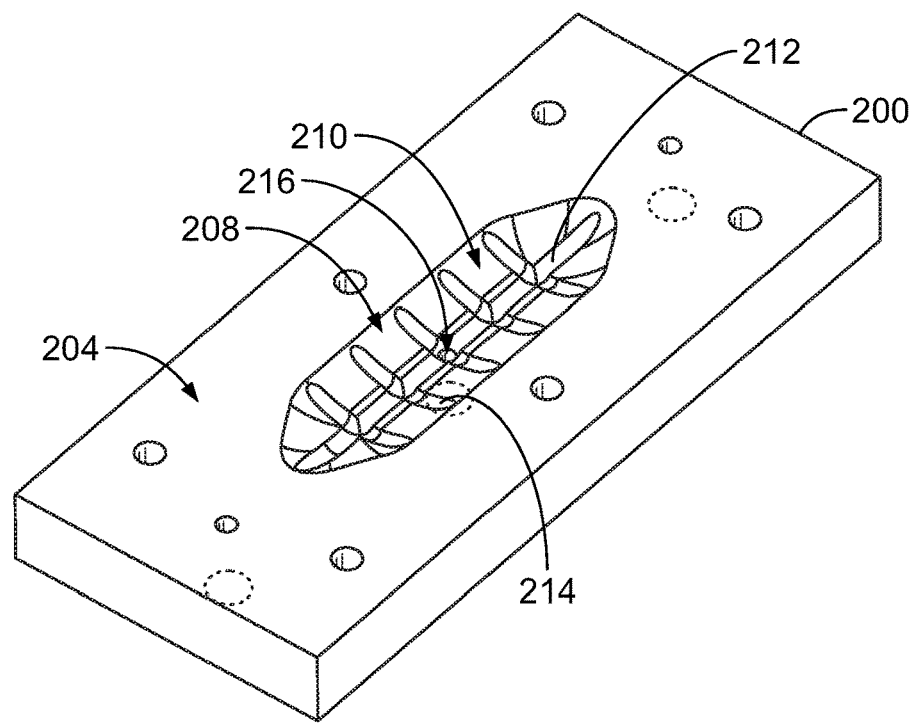
FIG. 7 illustrates a perspective view of a first housing section of a main body of a pressure accumulator formed in accordance with an embodiment.
Figure 8:
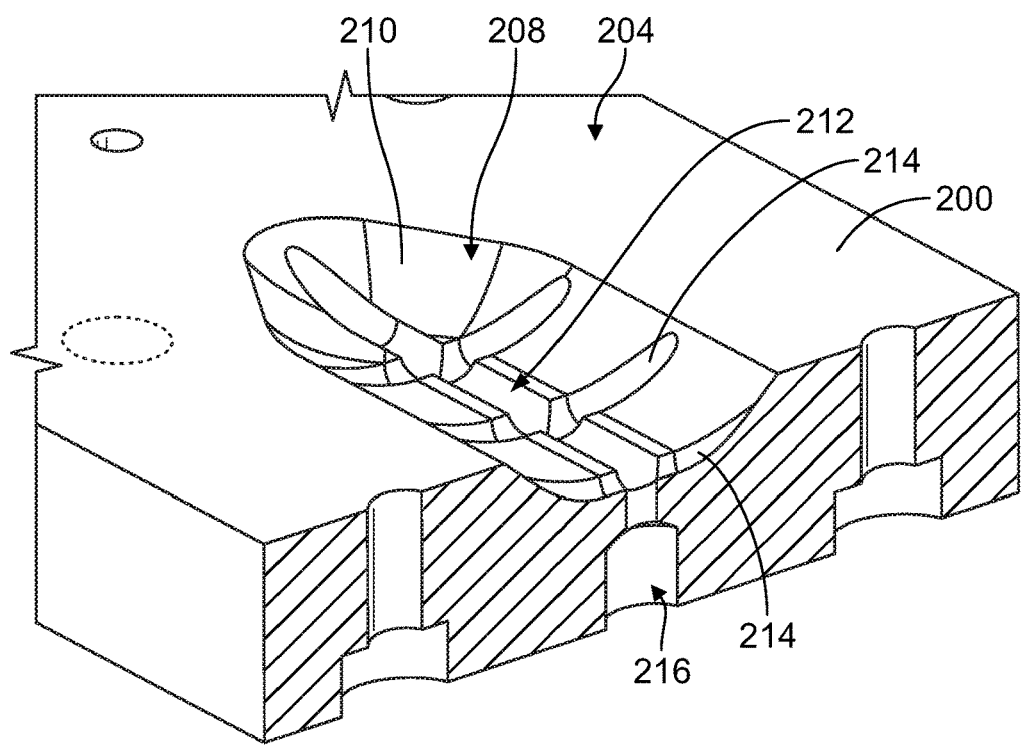
FIG. 8 illustrates a perspective cross-sectional view of the first housing section of FIG. 7.

FIG. 7 illustrates a perspective view of a first housing section 200 that is configured to be coupled to a second housing section 202 (shown in FIG. 9) to form a main body (not shown) of a pressure accumulator (not shown). FIG. 8 illustrates a perspective cross-sectional view of the first housing section 200. As shown, the first housing section 200 includes a mating surface 204 that is configured to interface with a corresponding mating surface 206 (shown in FIG. 9) of the second housing section 202. The mating surface 204 includes a cavity recess 208 that is defined by a control surface 210. The control surface 210 may be a portion of the mating surface 204.

As shown, the housing surface 210 includes a plurality of intersecting open-sided channels or grooves 212, 214. The grooves includes a main groove 212 that extends lengthwise along the cavity recess 208 and a plurality of lateral grooves 214 that extend across a width of the cavity recess 208. The grooves 212, 214 are in flow communication with an actuator port 216. The actuator port 216 is configured to fluidly couple to an actuator, such as the actuator 168 (FIG. 3). For example, the actuator may include one or more devices that are configured to provide a pressure flow of a working fluid into the cavity recess 208 (e.g., positive pressure) and a pressure flow of the working fluid out of the cavity recess 208 (e.g., negative pressure) in order to control movement of a chamber wall (not shown), such as the chamber wall 184. The intersecting grooves 212, 214 may enable a more uniform flow of the working fluid into or out of the cavity recess 208. For example, the pressure actuation side of the body cavity 174 may be designed such that grooves 212, 214 will always be open to grip at a surface of the chamber wall 184 so that the whole surface becomes flush to the chamber wall 184.

In alternative embodiments, however, the actuator does not move the chamber wall by adding or removing a working fluid. For example, the actuator may include a rod and piston. The piston may be secured to the chamber wall or define the chamber wall and be selectively moved by the actuator.

Figure 9:
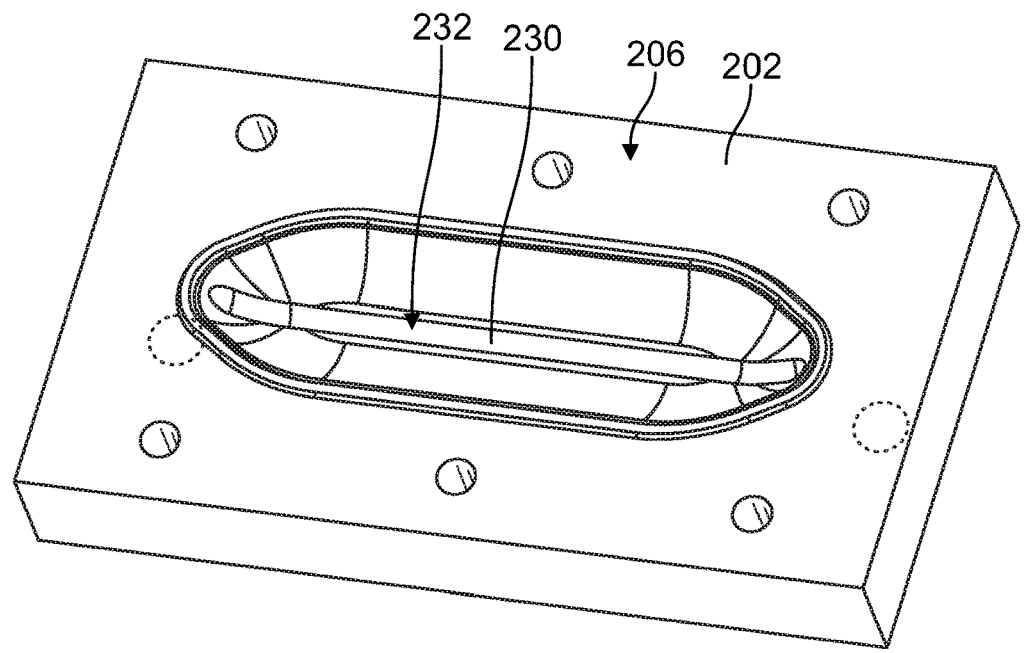
FIG. 9 illustrates a perspective view of a second housing section of a main body of a pressure accumulator formed in accordance with an embodiment.
Figure 10:
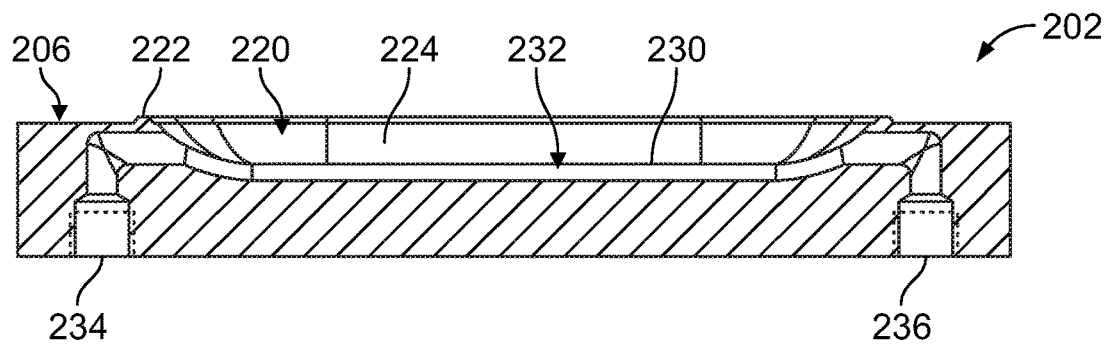
FIG. 10 illustrates a side cross-sectional view of the second housing section of FIG. 9.

FIG. 9 illustrates a perspective view of the second housing section 202, and FIG. 10 illustrates a side cross-sectional view of the second housing section 202. The second housing section 202 includes the mating surface 206 that is also shaped to define a cavity recess 220. The cavity recess 220 is defined by a body surface 224, which may be a portion of the mating surface 206. When the first and second housing sections 200, 202 are combined, the cavity recesses 208, 220 collectively form a body cavity, such as the body cavity 174 (shown in FIG. 2).

As shown in FIG. 10, the mating surface 206 may define a lip or track 222 that surrounds the cavity recess 220. In some embodiments, a chamber wall (not shown) may be positioned over the mating surface 206. When the first and second housing sections 200, 202 are secured to each other, the chamber wall may be held in a secured position between the mating surfaces 204, 206 by the lip 222. In other embodiments, however, the chamber wall may be secured between the first and second housing sections 200, 202 using other methods, such as fasteners and/or an adhesive.

Also shown in FIG. 10, in some embodiments, the main body may include a flow channel that is defined, at least in part, by a discontinuity section 230 of the body surface 224 and/or a discontinuity section of the chamber wall (not shown). As used herein, a discontinuity section is an abrupt change in the contour of the body surface or a surface of the chamber wall that is used to define a flow channel. For example, as shown in FIGS. 9 and 10, the cavity recess 220 has a continuous shape (e.g., bowl shape) in which the body surface 224 gradually extends away from and toward the lip 222. However, the body surface 224 includes a discontinuity section 230 that forms a groove 232. The discontinuity section 230 is an abrupt change in the contour of the body surface 224 that defines the cavity recess 220.

As shown in FIG. 10, the groove 232 (or the flow channel) extends between an inlet 234 and an outlet 236 of the second housing section 202 and fluidly couples the inlet 234 and the outlet 236. In such embodiments in which the chamber wall is significantly displaced, the groove 232 may ensure that a flow channel exists between the inlet 234 and the outlet 236.

Figure 11:
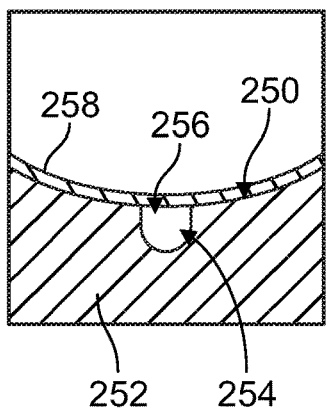
FIG. 11 is a cross-section of a portion of a main body illustrating a chamber wall in a fully displaced position in accordance with an embodiment.
Figure 12:
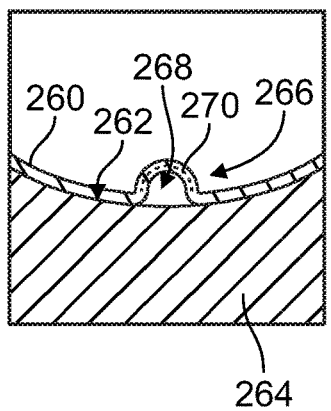
FIG. 12 is another cross-section of a portion of a main body illustrating a chamber wall in a fully displaced position in accordance with an embodiment.
Figure 13:
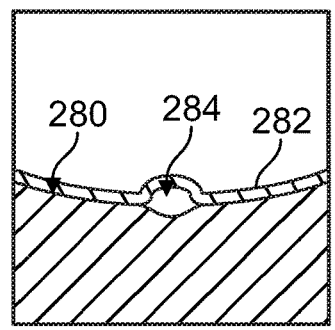
FIG. 13 is another cross-section of a portion of a main body illustrating a chamber wall in a fully displaced position in accordance with an embodiment.

FIGS. 11-13 illustrated different cross-sections of a body cavity in which a body surface and a chamber wall are shaped relative to each other such that a flow channel exists therebetween. For example, in FIG. 11, a body surface 250 of a housing section 252 is shown and defines an interior chamber 254. In this example, the interior chamber 254 only exists within a flow channel 256. More specifically, a chamber wall 258 is fully displaced such that a majority of the chamber wall 258 is pressed against the body surface 250 and vice versa. As shown, almost an entirety of the chamber wall 258 is pressed against the body surface 250. Likewise, almost an entirety of the body surface 250 is pressed against the chamber wall 258. In this example, the discontinuity section is the groove formed by the body surface 250 that defines the flow channel 256.

In FIG. 12, a chamber wall 260 is fully displaced and pressed against a body surface 262 of a housing section 264. As shown, the chamber wall 260 includes a discontinuity section 266 in which the chamber wall 260 is shaped to define a flow channel 268. The flow channel 268 is enclosed by the body surface 262 when the chamber wall 260 is fully displaced. The discontinuity section 266 may be formed by one or more methods. For example, a rigid support member 270 (indicated by dashed line) may be embedded within the material that forms the chamber wall 260 or may be coupled to an inner or outer surface of the chamber wall 260. The support member 270 may be, for example, a metal strip or a rigid piece of plastic. The shape of the support member 270 may define the shape of the flow channel 268. The support member 270 may also resist a change in the shape of the flow channel 268 when the chamber wall 260 is fully displaced. In other embodiments, the discontinuity section 266 may include increased thickness in the chamber wall 260 and/or a molded three-dimensional shape. For example, the discontinuity section 266 may be molded as shown in FIG. 12. FIG. 13 illustrate an embodiment in which both a body surface 280 and the chamber wall 282 have discontinuity sections that are shaped to define a flow channel 284 therebetween.

In alternative embodiments, the flow channel may be entirely defined by a housing section. For example, a passage may be formed that interconnects two fluidic lines without extending along the interior chamber.

Figure 14:
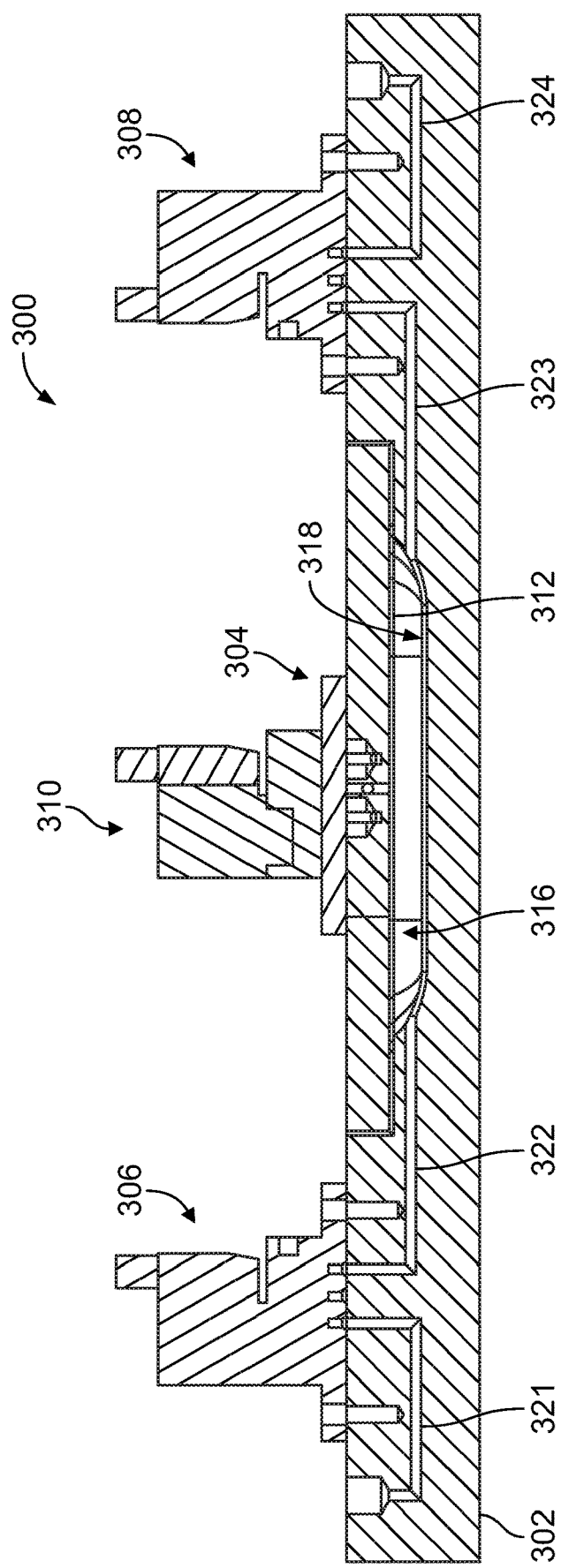
FIG. 14 is a side cross-sectional view of a sub-assembly of a flow-control system in accordance with an embodiment.

FIG. 14 is a side cross-sectional view of a sub-assembly 300 of a flow-control system (not shown) in accordance with an embodiment. The sub-assembly 300 includes a base manifold 302 that may be, for example, molded from a chemically compatible material. For example, the base manifold 302 may be molded from Ultem1000 or PEEK. The sub-assembly 300 also includes a pressure accumulator 304 and first and second valves 306, 308 that are mounted to the base manifold 302. The pressure accumulator 304 is fluidly coupled between the first and second valves 306, 308. The first and second valves 306, 308 may be similar to the first and second valves 160, 162 (FIG. 2), respectively. For example, the first and second valves 306, 308 may be multi-valves (e.g., two-way valves). The pressure accumulator 304 also includes a multi-valve 310 that is configured to be operably coupled to pressure sources (e.g., positive and negative pressure sources) or other actuators for moving a chamber wall 312 of the pressure accumulator 304.

Also shown in FIG. 14, the pressure accumulator 304 includes an interior chamber 316 that is defined between a body surface 318 of the base manifold 302 and the chamber wall 312. The chamber wall 312 is formed from a flexible or elastic membrane. As shown, the base manifold 302 has been shaped to include a fluidic line 321 that fluidly couples the first valve 306 to a fluid reservoir (not shown). The fluid reservoir may be removably mounted or coupled to the sub-assembly 300. The base manifold 302 also includes a fluidic line 322 that fluidly couples the first valve 306 to the pressure accumulator 304 and a fluidic line 323 that fluidly couples the pressure accumulator 304 to the second valve 308. The base manifold 302 also includes a fluidic line 324 that fluidly couples the second valve 308 to another portion of the flow-control system. For example, the fluidic line 324 may be in flow communication with a selector valve. The sub-assembly 300 and the pressure accumulator 304 may operate in a similar manner as described above with respect to the flow-control system 150 (FIG. 2).

Figure 15:
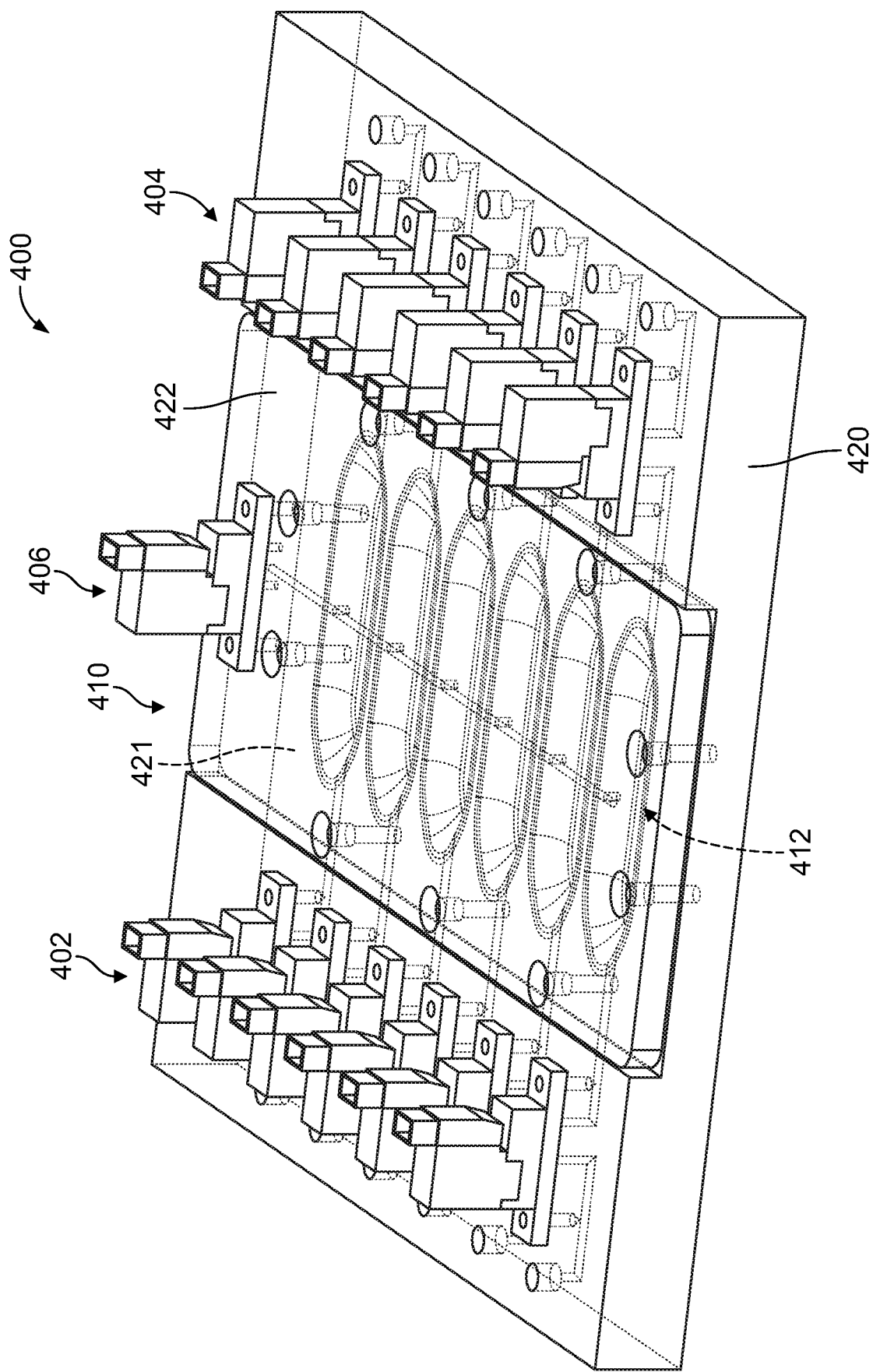
FIG. 15 is a perspective view of a sub-assembly of a flow-control system in accordance with an embodiment.

FIG. 15 is a perspective view of a sub-assembly 400 of a flow-control system (not shown) in accordance with an embodiment. The sub-assembly 400 may be identical to the sub-assembly 300, except the sub-assembly 400 includes multiple first valves 402, multiple second valves 404, and a single multi-valve 406. Each of the first valves 402 is in flow communication with a single second valve 404 through a single interior chamber 412. This line may be referred to as a pressure booster line. As such, FIG. 15 illustrates six (6) pressure booster lines that are controlled by a pressure accumulator 410. The multi-valve 406 is configured to simultaneously control pressure of a plurality of body cavities and thereby simultaneously move the chamber walls (not shown).

Also shown in FIG. 15, the sub-assembly 400 may include a single base manifold 420 and a single cover manifold 422. The base manifold 420 and the cover manifold 422 may have a single membrane sheet 421 compressed therebetween. The single membrane sheet 421 may form the chamber walls that define each of the interior chambers 412.

In FIGS. 16-28, the circles are similar or identical to the first and second valves described herein. For example, the circles may represent two-way valves. Valves that are open may have a different color or density than valves that are closed. The hexagons represent three-way valves and the triangles represent pressure sources. One of the pressure sources provides positive pressure and the other provides negative pressure. Arrows within the hexagons may indicate which of the pressure sources is operably coupled through the three-way valve.

Figure 16:
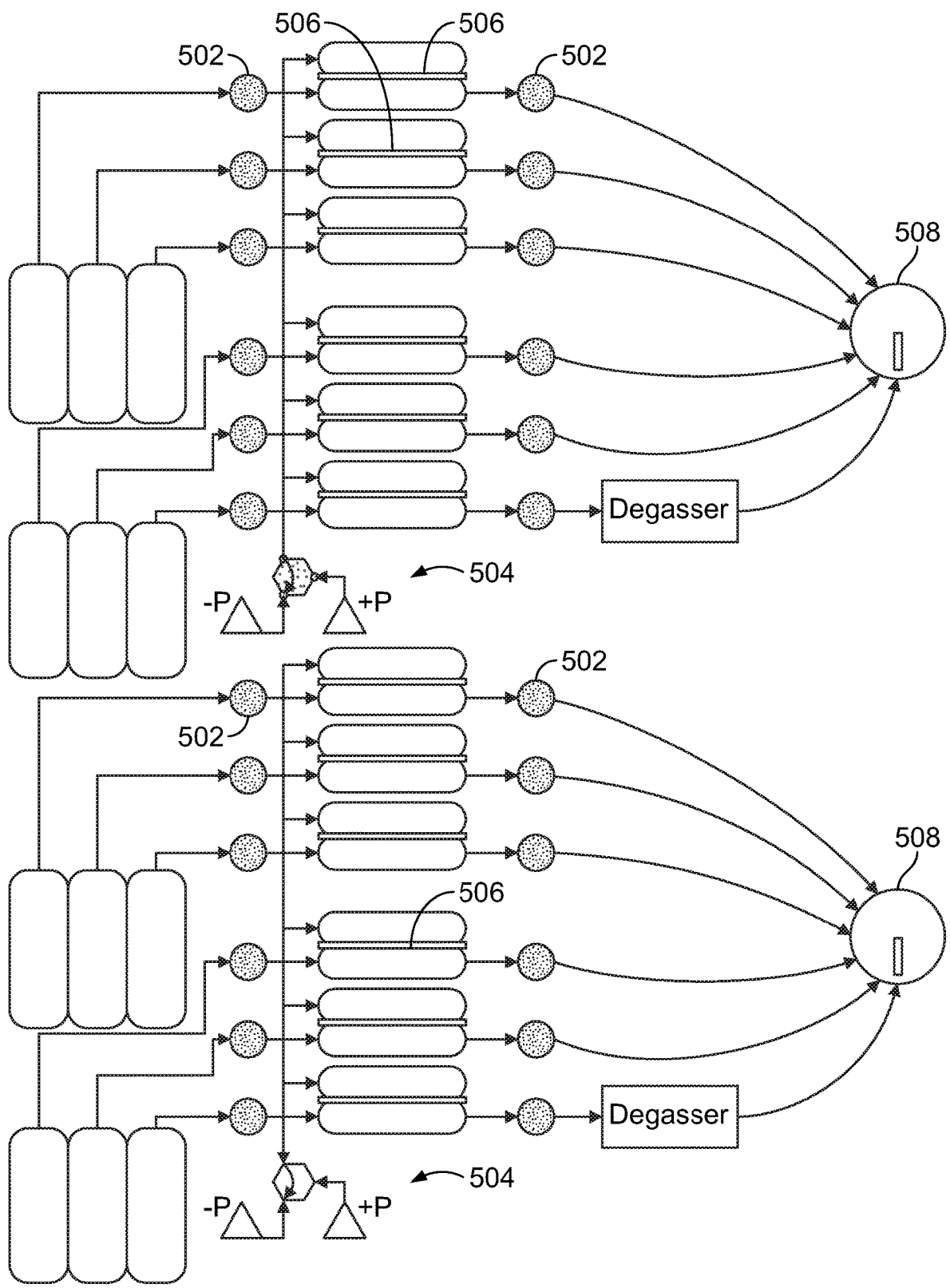
FIG. 16 is a schematic diagram of a flow-control system in accordance with an embodiment.

FIGS. 16-28 illustrate different schematic diagrams of flow-control systems. FIG. 16 illustrates a flow-control system that includes twenty-four two-way valves 502 and two three-way valves 504 that are operably coupled to pressure sources (not shown) and are each configured to control a six chamber walls 506. The flow-control system also includes two selector valves 508. In some embodiments, the three-way valves may simultaneously operate all six chamber walls. In other embodiments, the three-way valves may selectively operate a plurality of the chamber walls (e.g., less than six but more than one) simultaneously. In some embodiments, the three-way valves may selectively operate only one chamber wall. For example, the two-way valves located upstream and downstream from the interior chambers may be selectively operated to allow flow of fluid therethrough and thereby permit the three-way valves to control the chamber walls. Accordingly, a wall actuator may be configured to move at least two chamber walls at different times.

FIGS. 17-28 illustrate other schematic diagrams of flow-control systems. As shown, embodiments may include a variety of flow-control systems. In some embodiments, each interior chamber is configured to receive only one type of fluid (e.g., reagent solution). It is contemplated, however, that an interior chamber may be used to control flow of two or more fluids. In such embodiments, the two-way valve located upstream from the interior chamber may be a different type of multi-valve or a selector valve.

Figure 17:
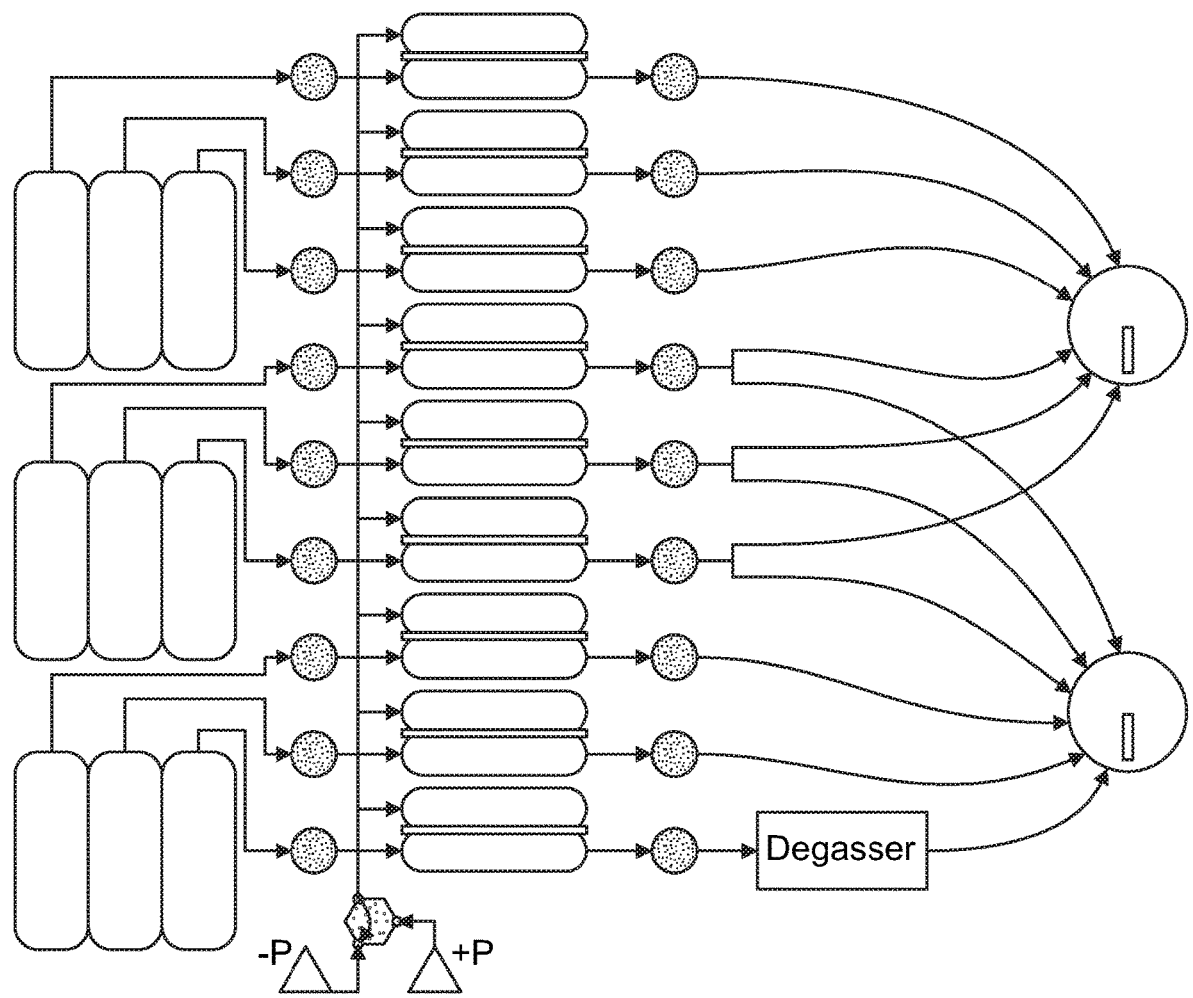
FIG. 17 is a schematic diagram of a flow-control system in accordance with an embodiment.
Figure 18:
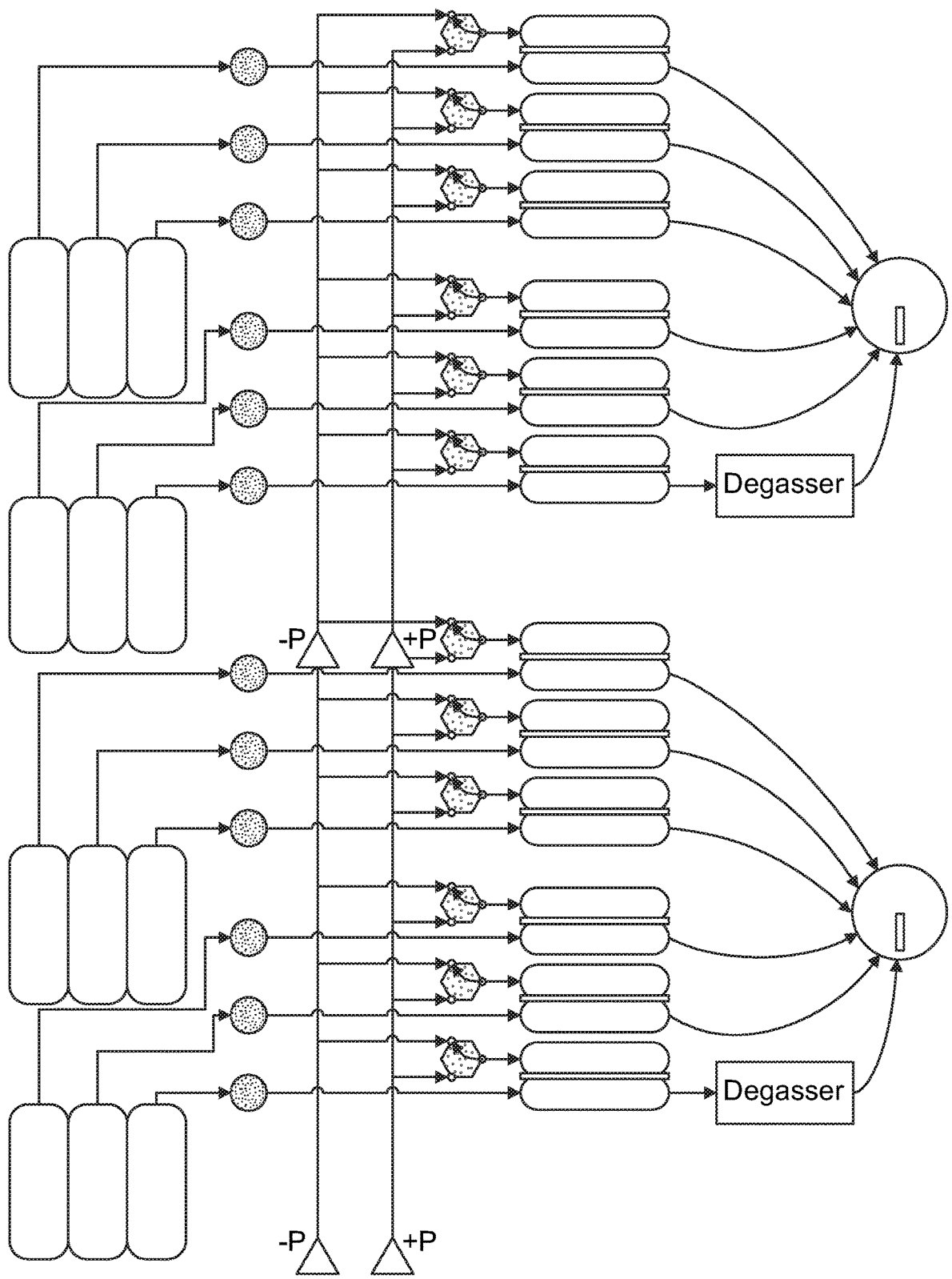
FIG. 18 is a schematic diagram of a flow-control system in accordance with an embodiment.
Figure 19:
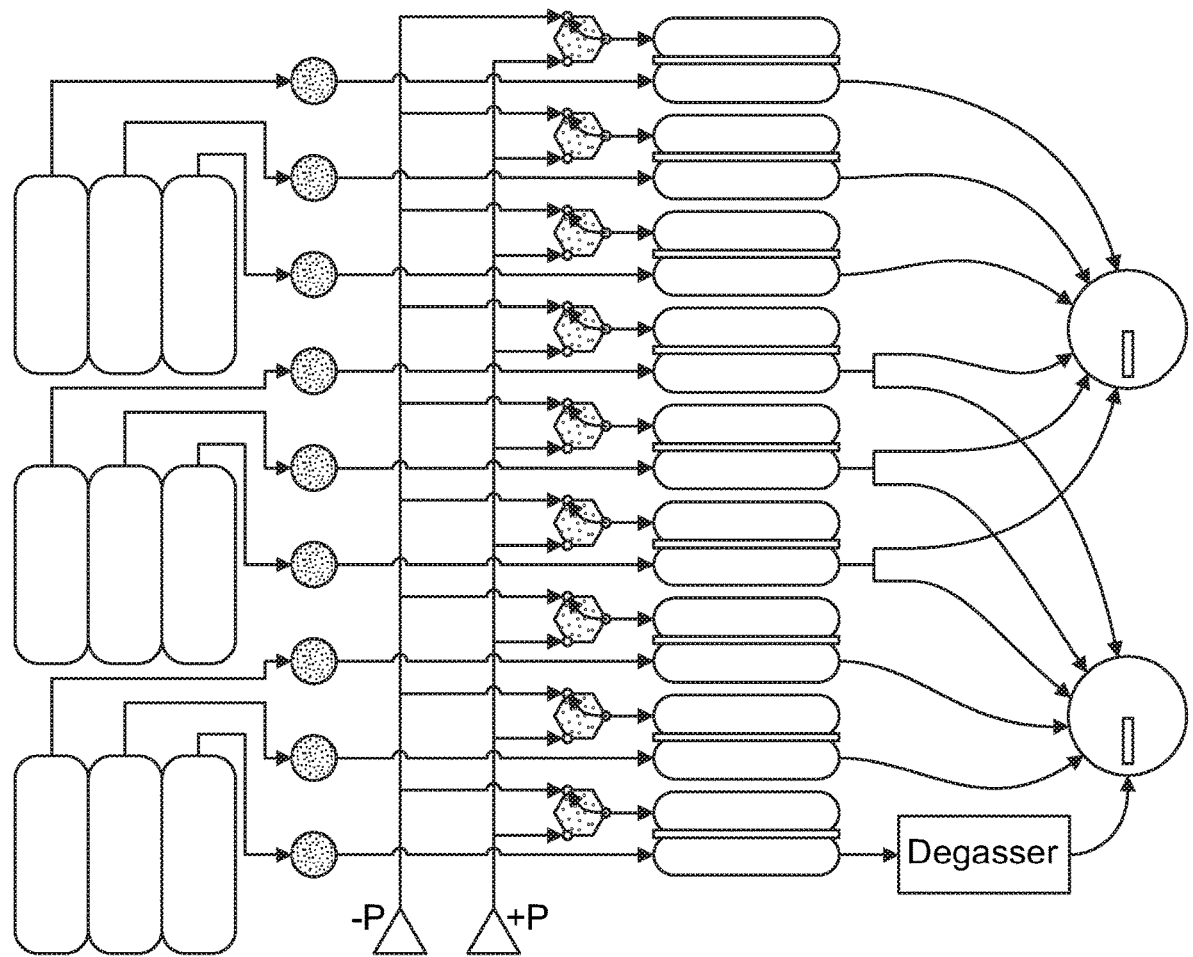
FIG. 19 is a schematic diagram of a flowcontrol system in accordance with an embodiment.
Figure 22:
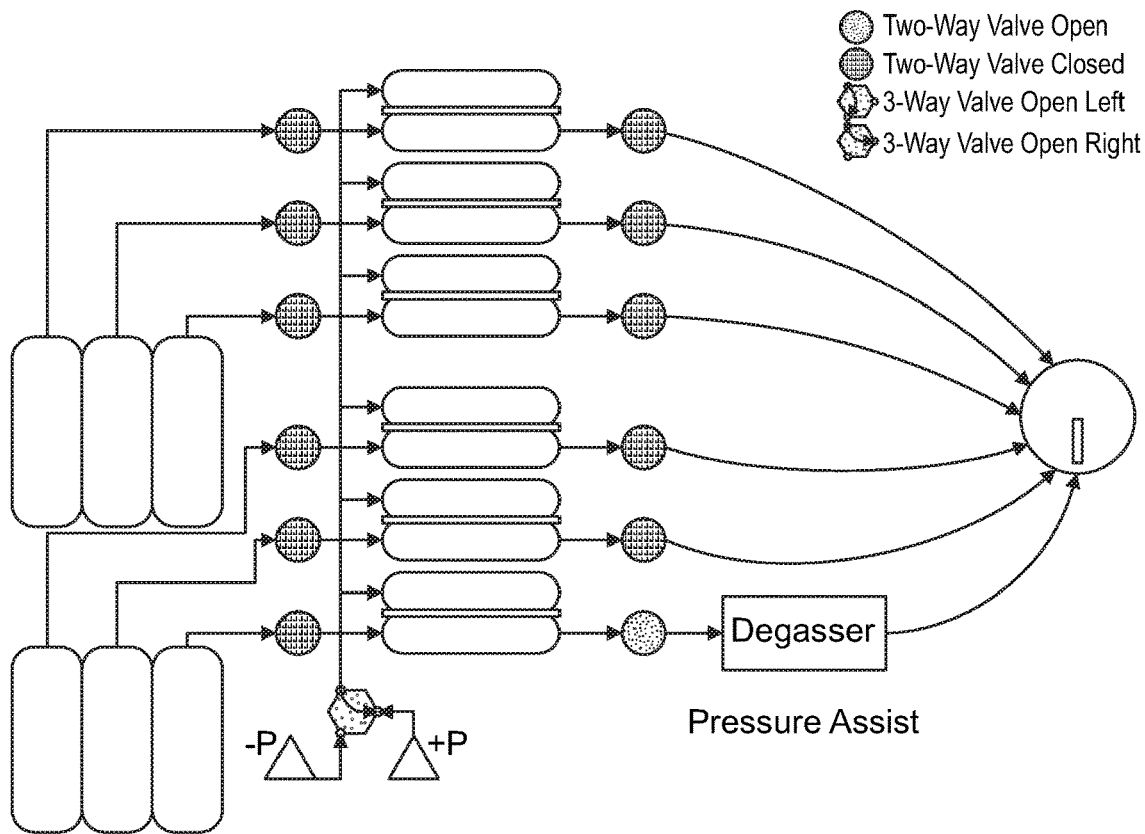
FIG. 22 is a schematic diagram of the flow-control system of FIG. 20 during a designated flow-control operation.
Figure 23:
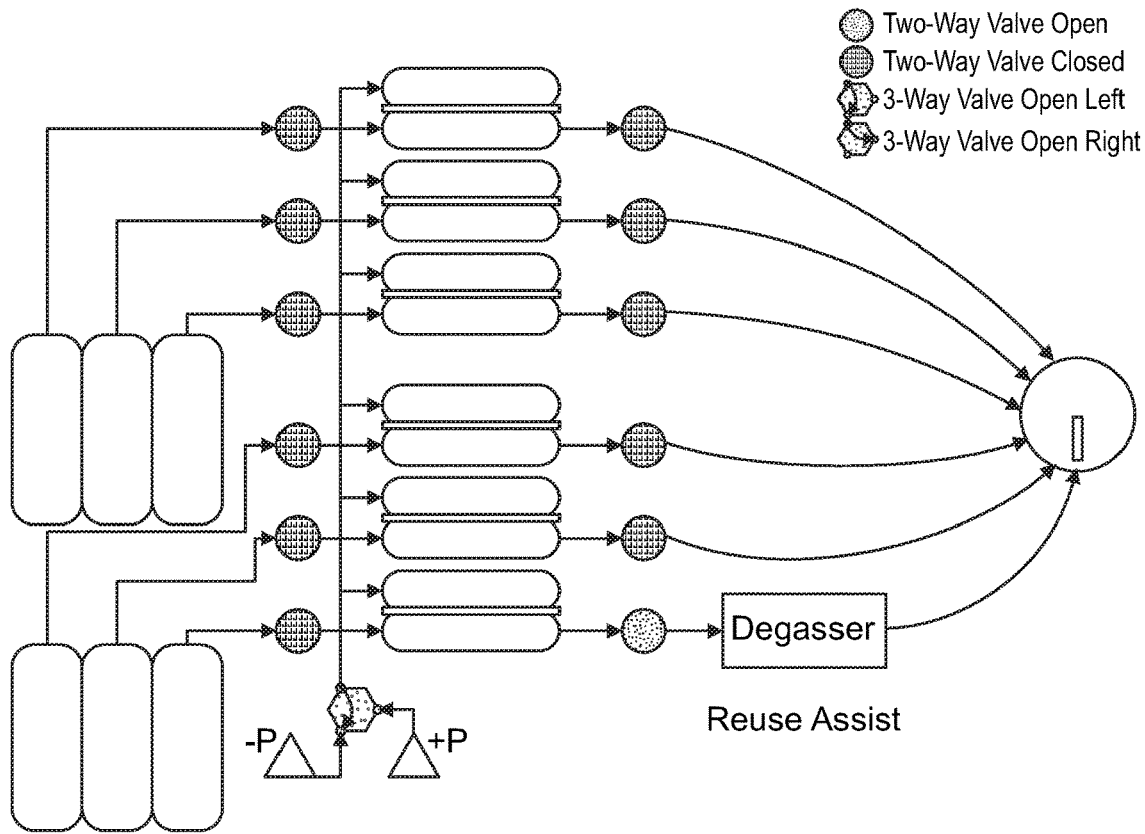
FIG. 23 is a schematic diagram of the flow-control system of FIG. 20 during a designated flow-control operation.
Figure 24:
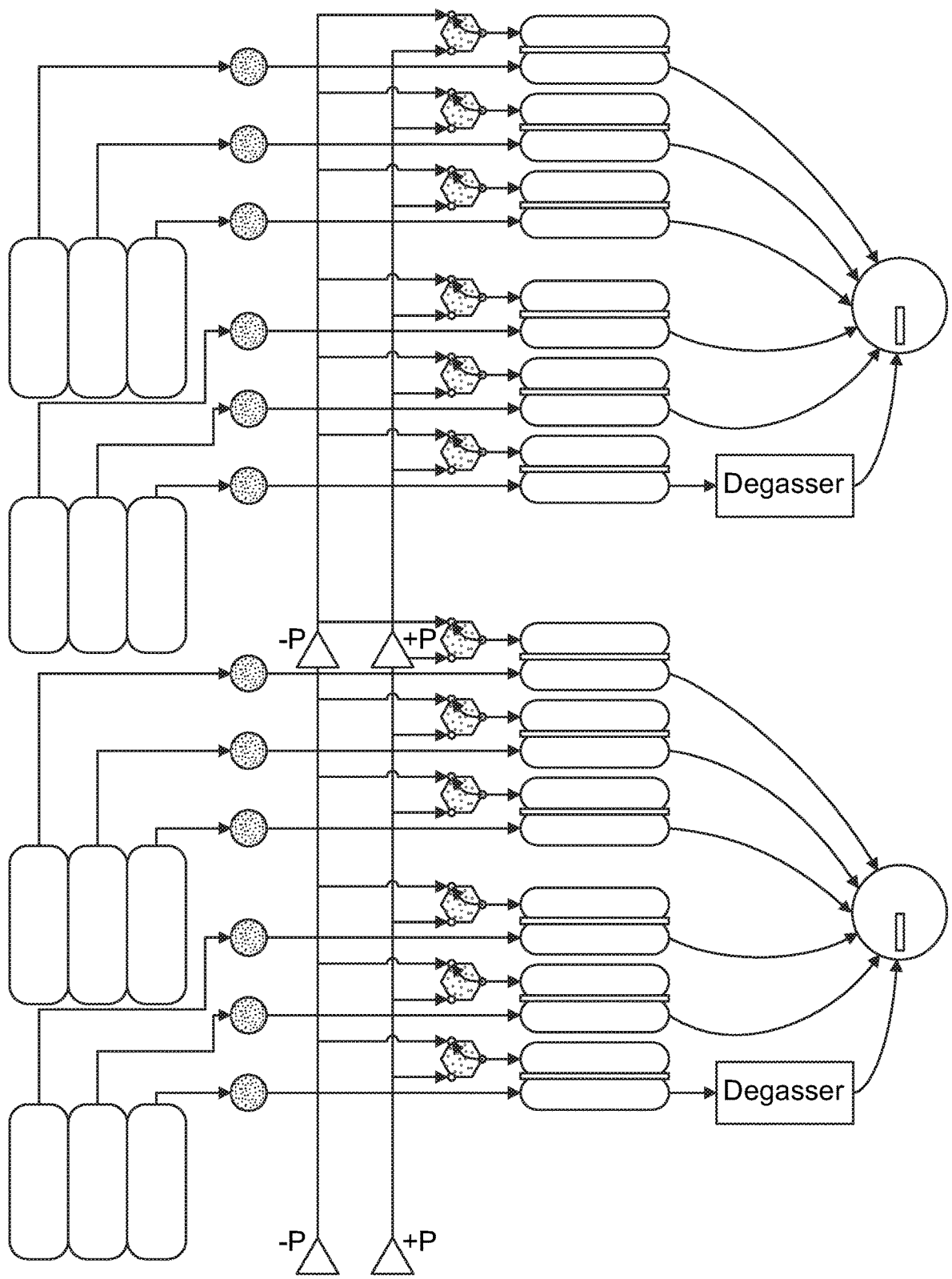
FIG. 24 is a schematic diagram of a flow-control system in accordance with an embodiment.
Figure 25:
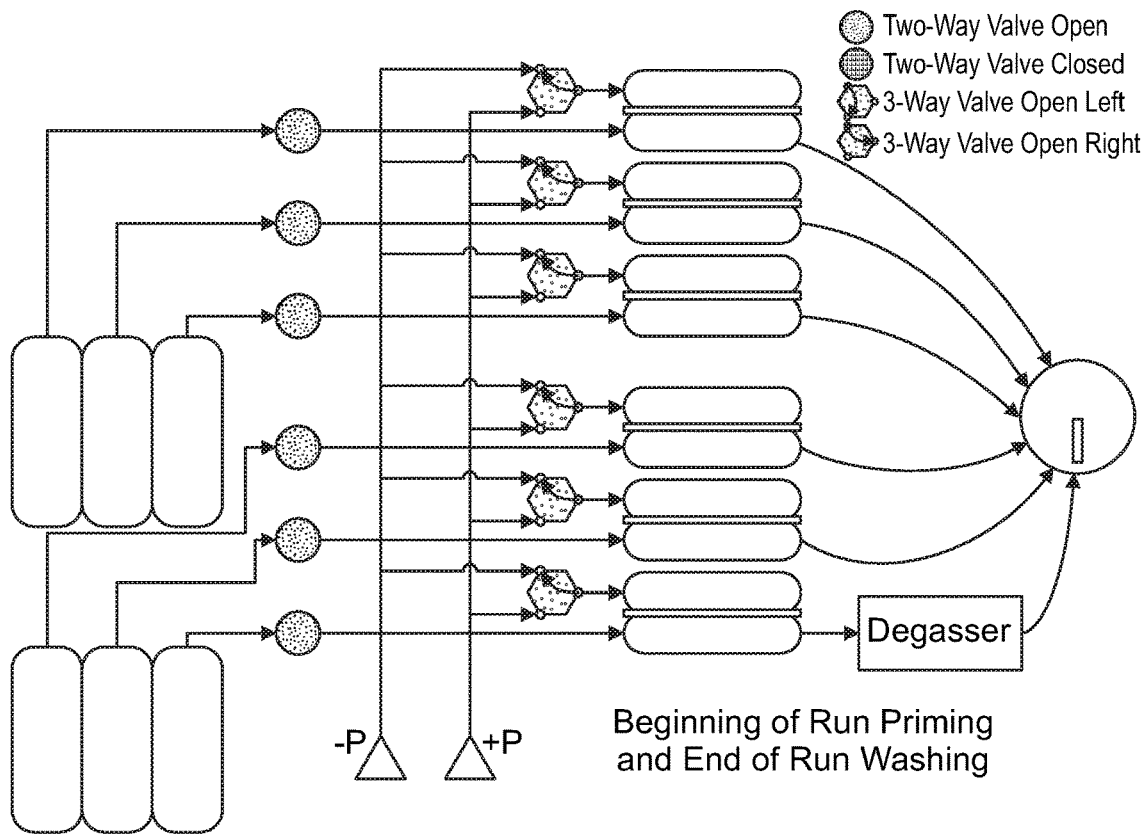
FIG. 25 is a schematic diagram of a flow-control system in accordance with an embodiment.
Figure 26:
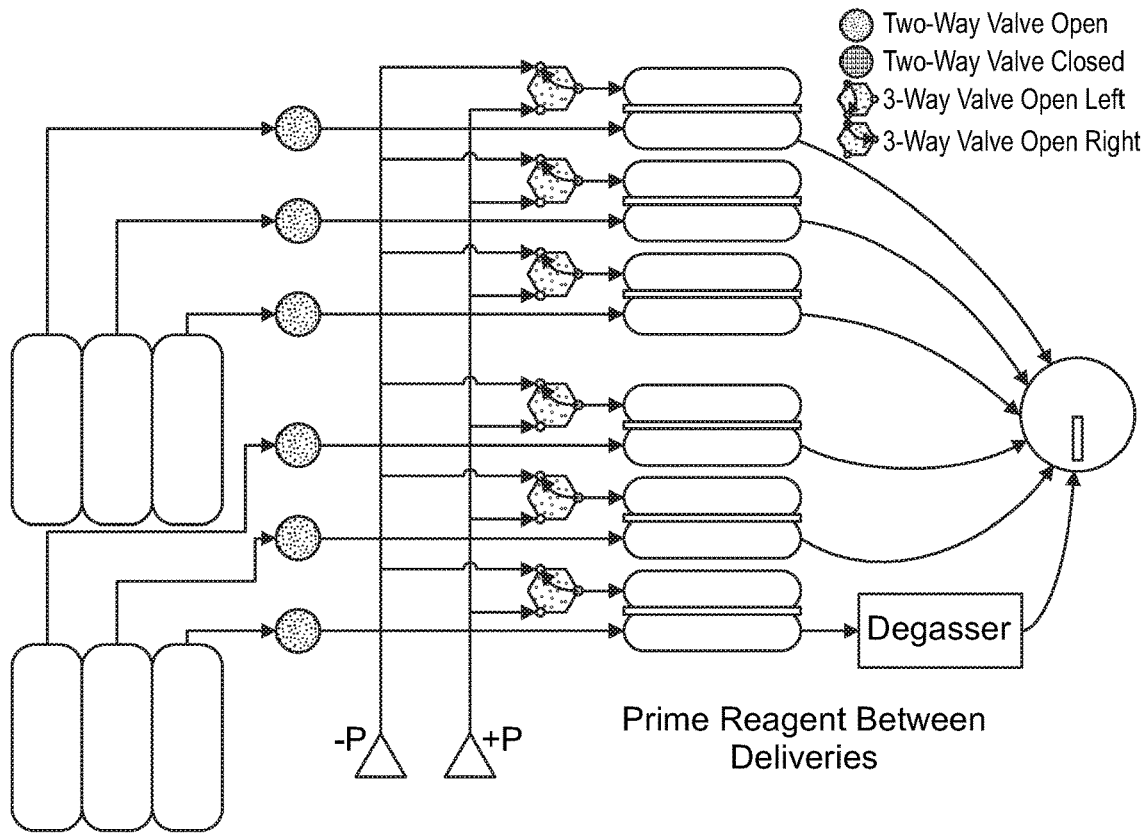
FIG. 26 is a schematic diagram of the flow-control system of FIG. 25 during a designated flow-control operation.
Figure 27:
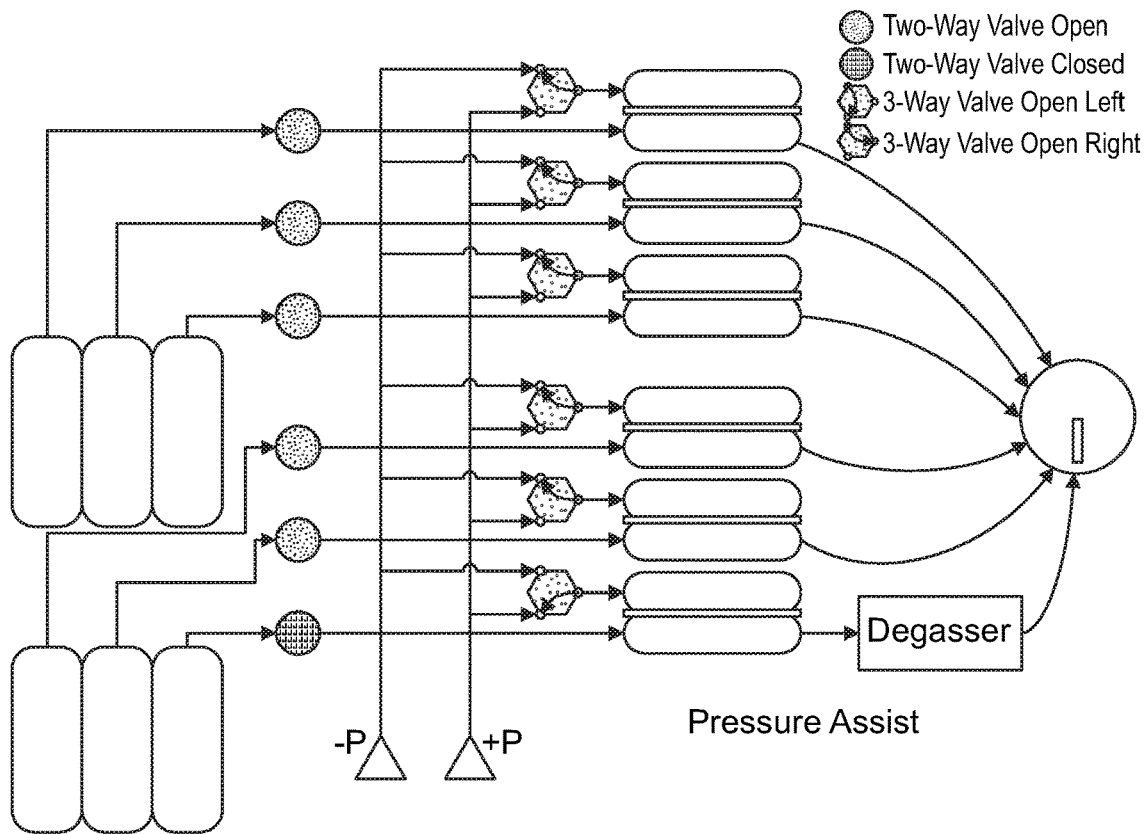
FIG. 27 is a schematic diagram of the flow-control system of FIG. 25 during a designated flow-control operation.
Figure 28:
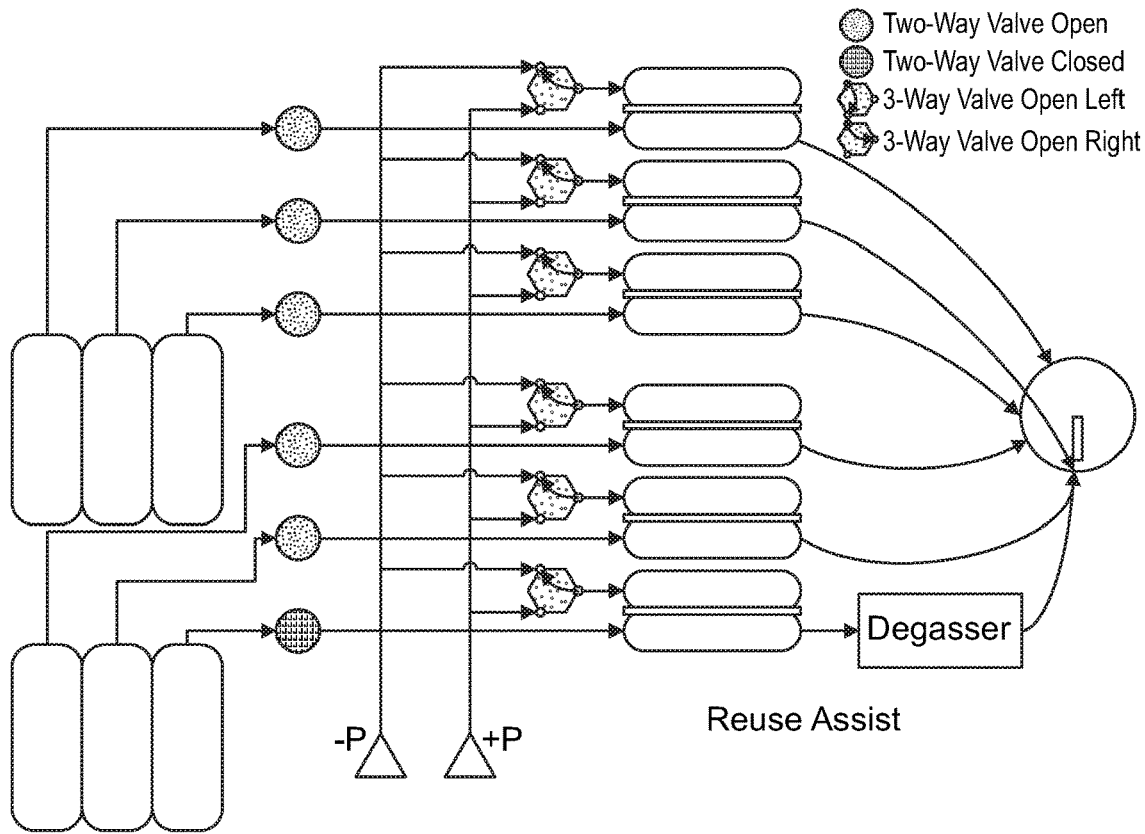
FIG. 28 is a schematic diagram of the flow-control system of FIG. 25 during a designated flow-control operation.

FIG. 17 includes eighteen (18) wetted two-way valves, one dry three-way valve, and two selector valves. The middle six two-way valves have two times (2×) the duty cycle. The three-way valve has twelve (12) times (12×) the duty cycle. FIG. 18 includes twelve (12) wetted two-way valves and twelve (12) dry three-way valves. FIG. 19 includes nine wetted two-way valves and nine dry three-way valves. The middle three two-valves and the middle three three-way valves have two times (2×) the duty cycle. FIG. 24 has twelve (12) wetted two-way valves and twelve (12) dry three-way valves.

It is to be understood that the above description is intended to be illustrative, and not restrictive. Moreover, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The following claims recite aspects of certain embodiments of the inventive subject matter and are considered to be part of the above disclosure. Moreover, these aspects may be combined with one another.

What is claimed is:
1. A flow-control system comprising:
a fluid reservoir configured to store a fluid;
a pressure accumulator in flow communication with and positioned downstream from the fluid reservoir;
a loading zone configured to receive and fluidly couple to a flow cell having a biological or chemical sample, the loading zone being in flow communication with and positioned downstream from the pressure accumulator; and
a system pump in flow communication with and positioned downstream from the loading zone, the system pump configured to induce a flow of the fluid from the fluid reservoir and through the pressure accumulator and the loading zone;
wherein the pressure accumulator includes a wall actuator and an interior chamber that is defined by a movable chamber wall and has an operating volume, the wall actuator configured to move the chamber wall and thereby change the operating volume of the interior chamber, the pressure accumulator configured to receive fluid into the interior chamber from the fluid reservoir during a filling operation, the wall actuator configured to move the chamber wall to impart pressure on the fluid and drive the fluid toward the loading zone during a pressure-assist operation;
wherein the interior chamber is defined by a body surface, wherein at least one of the chamber wall and the body surface has a discontinuity section that defines a flow channel between the chamber wall and the body surface.

2. The flow-control system of claim 1, further comprising a processing unit configured to control operation of the system pump and the pressure accumulator in accordance with a predetermined schedule, the predetermined schedule includes repeating the filling operation and the pressure-assist operation at least ten times.

3. The flow-control system of claim 2, wherein the processing unit is configured to control operation of the system pump and the pressure accumulator in accordance with a sequencing-by-synthesis (SBS) protocol.

4. The flow-control system of claim 2, wherein the processing unit is configured to control operation of the system pump and the pressure accumulator to perform a recycling operation in which the fluid from the flow cell is drawn back to the interior chamber of the pressure accumulator.

5. The flow-control system of claim 1, wherein the filling operation is performed during at least one of (a) a reaction period in which reagents react with the biological or chemical sample in the flow cell or (b) an offline period in which the pressure accumulator is not in flow communication with the system pump.

6. The flow-control system of claim 1, further comprising first and second valves, the first valve being positioned between the fluid reservoir and the pressure accumulator, the second valve being positioned between the pressure accumulator and the flow cell, wherein:
the first valve is in an open state and the second valve is in a closed state during the filling operation; and
the first valve is in a closed state and the second valve is in an open state during the pressure-assist operation.

7. The flow-control system of claim 6, wherein the first valve is in a closed state and the second valve is in an open state during a recycling operation in which the movable chamber wall causes the fluid to flow from the flow cell back into the interior chamber.

8. The flow-control system of claim 1, wherein the chamber wall has the discontinuity section, the discontinuity section of the chamber wall including at least one of (a) a support member that shapes the discontinuity section; (b) an increased thickness in the chamber wall; (c) or a molded three-dimensional shape.

9. The flow-control system of claim 1, wherein the body surface has the discontinuity section, the discontinuity section including a groove shaped by the body surface.

10. The flow-control system of claim 1, wherein the interior chamber is defined by a body surface, wherein the chamber wall and the body surface are shaped relative to each other such that a flow channel is formed therebetween when the chamber wall is at a maximum displacement.

11. The flow-control system of claim 1, wherein the interior chamber is defined by a body surface, wherein the chamber wall and the body surface are shaped relative to each other such that respective areas of the chamber wall and the body surface press against each other and other areas of the chamber wall and the body surface have a flow channel therebetween.

12. The flow-control system of claim 1, further comprising a flow sensor, the wall actuator being configured to (a) move the chamber wall at designated times or (b) move the chamber wall at different rates, wherein the designated times or different rates are based on a pressure of the fluid within the flow-control system.

13. The flow-control system of claim 1, further comprising a plurality of interior chambers and a plurality of chamber walls that define respective interior chambers, wherein the wall actuator is configured to move at least two of the chamber walls at different times.

14. The flow-control system of claim 1, further comprising a plurality of interior chambers and a single membrane sheet that form the chamber walls that define the interior chambers.

15. The flow-control system of claim 1, wherein the interior chamber has an operating volume that is substantially less than a total volume of the fluid reservoir.

16. A pressure accumulator comprising:
a main body having an inlet, an outlet, and an interior chamber, the inlet and the outlet being in flow communication with each other through the interior chamber, the interior chamber being defined by a body surface;
a chamber wall that also defines the interior chamber; and
a wall actuator configured to move the chamber wall to different positions relative to the body surface to change an operating volume of the interior chamber, the chamber wall configured to move between a retracted position and a displaced position, the operating volume of the interior chamber being greater in the retracted position than in the displaced position;
wherein the chamber wall and the body surface are shaped relative to each other to define a flow channel therebetween when the chamber wall is in the displaced position, the flow channel fluidly coupling the inlet and the outlet;
wherein at least one of the chamber wall and the body surface has a discontinuity section that defines the flow channel between the chamber wall and the body surface.

17. The pressure accumulator of claim 16, wherein the discontinuity section includes an abrupt change in a contour of the chamber wall or the body surface.

18. The pressure accumulator of claim 16, wherein the chamber wall has the discontinuity section, the discontinuity section of the chamber wall including at least one of (a) a support member that shapes the discontinuity section; (b) an increased thickness in the chamber wall; (c) or a molded three-dimensional shape.

19. The pressure accumulator of claim 16, wherein the body surface has the discontinuity section, the discontinuity section including a groove shaped by the body surface.

20. The pressure accumulator of claim 16, wherein the chamber wall and the body surface are shaped relative to each other such that the flow channel is formed therebetween when the chamber wall is at a maximum displacement.

21. The pressure accumulator of claim 16, wherein the chamber wall and the body surface are shaped relative to each other such that respective areas of the chamber wall and the body surface press against each other and other areas of the chamber wall and the body surface have the flow channel therebetween.

22. The pressure accumulator of claim 16, wherein the flow channel has a substantially uniform cross-sectional area between the inlet and the outlet.

23. The pressure accumulator of claim 16, wherein the inlet and outlet have respective cross-sectional areas, the flow channel having a cross-sectional area that is substantially equal to at least one of the inlet and outlet cross-sectional areas.

24. The pressure accumulator of claim 23, wherein the cross-sectional area of the flow channel is within 35% of the cross-sectional area of the inlet and the cross-sectional area of the outlet.

25. A method of delivering fluid to a flow cell, the method comprising:
   fluidly coupling a flow cell to a loading zone of a flow-control system, the flow-control system including a fluid reservoir that stores a fluid, a pressure accumulator that is fluidly coupled between the fluid reservoir and the flow cell, and a system pump that is in flow communication with and positioned downstream from the flow cell;
   inducing a flow of the fluid from the fluid reservoir and through the pressure accumulator and the flow cell using the system pump; and
   boosting a pressure of the fluid within the flow-control system using the pressure accumulator;
   wherein the pressure accumulator includes a wall actuator and an interior chamber that is defined by a movable chamber wall and has an operating volume, the wall actuator configured to move the chamber wall and thereby change the operating volume of the interior chamber, the pressure accumulator configured to receive the fluid into the interior chamber from the fluid reservoir during a filling operation, the wall actuator configured to move the chamber wall to impart pressure on the fluid and drive the fluid toward the loading zone during a pressure-assist operation;
   wherein the interior chamber is defined by a body surface, wherein at least one of the chamber wall and the body surface has a discontinuity section that defines a flow channel between the chamber wall and the body surface.

* * * * *